United States Patent [19]
Kennard et al.

[11] Patent Number: 5,804,008
[45] Date of Patent: Sep. 8, 1998

[54] METHOD AND APPARATUS FOR MAKING A TUFTSTRING CARPET

[75] Inventors: Jeffrey Lee Kennard, Hockessin; Carl Frederick Morin, Wilmington; Kalika Ranjan Samant, Hockessin, all of Del.

[73] Assignee: E. I. du Pont de Nemours and Company, Wilmington, Del.

[21] Appl. No.: 919,420

[22] Filed: Aug. 27, 1997

Related U.S. Application Data

[63] Continuation of Ser. No. 513,734, Aug. 10, 1995, abandoned, which is a continuation-in-part of Ser. No. 298,642, Aug. 31, 1994, abandoned.

[51] Int. Cl.⁶ .............................. B32B 31/20; B32B 5/08
[52] U.S. Cl. .................... 156/72; 156/78.2; 156/173; 156/174; 156/175; 156/435; 156/580.2
[58] Field of Search ............................ 156/72, 73.2, 169, 156/173, 174, 175, 435, 580.2; 428/93, 95

[56] References Cited

U.S. PATENT DOCUMENTS

| | | | |
|---|---|---|---|
| 2,475,019 | 7/1949 | Faris | 57/18 |
| 2,602,765 | 7/1952 | Ahier et al. | 154/78 |
| 2,680,469 | 6/1954 | Ahier et al. | 154/1.1 |
| 2,698,044 | 12/1954 | Runton et al. | 154/1.1 |
| 2,698,045 | 12/1954 | Runton et al. | 154/1.1 |
| 2,738,296 | 3/1956 | Runton et al. | 154/49 |
| 3,034,942 | 5/1962 | Heiks | 154/49 |
| 3,633,974 | 1/1972 | Lewis, Jr. | 300/21 |
| 3,640,786 | 2/1972 | Carpenter | 156/73 |
| 3,715,878 | 2/1973 | Kim | 57/156 |
| 3,736,209 | 5/1973 | Carpenter | 156/435 |
| 4,502,902 | 3/1985 | Zurcher et al. | 156/73.2 |
| 4,752,114 | 6/1988 | French | 350/96.24 |
| 4,867,814 | 9/1989 | Mantovani . | |
| 4,871,603 | 10/1989 | Malone | 428/95 |
| 4,923,730 | 5/1990 | Taniguchi et al. | 428/92 |
| 4,960,020 | 10/1990 | Reinhard . | |
| 4,964,932 | 10/1990 | Miller . | |
| 5,082,712 | 1/1992 | Starp | 428/95 |
| 5,470,629 | 11/1995 | Mokhtar et al. . | |
| 5,472,762 | 12/1995 | Edwards et al. . | |

FOREIGN PATENT DOCUMENTS

| | | |
|---|---|---|
| 5-263372 | 12/1993 | Japan . |
| 707930 | 11/1970 | South Africa . |

*Primary Examiner*—Michael W. Ball
*Assistant Examiner*—Sam Chuan Yao

[57] ABSTRACT

A method and apparatus for making a carpet formed from a plurality of tuftstrings bonded to a backing. Methods and apparatii for accurately positioning the tuftstring and ultrasonically bonding multiple tuftstrings to the backing is disclosed.

2 Claims, 20 Drawing Sheets

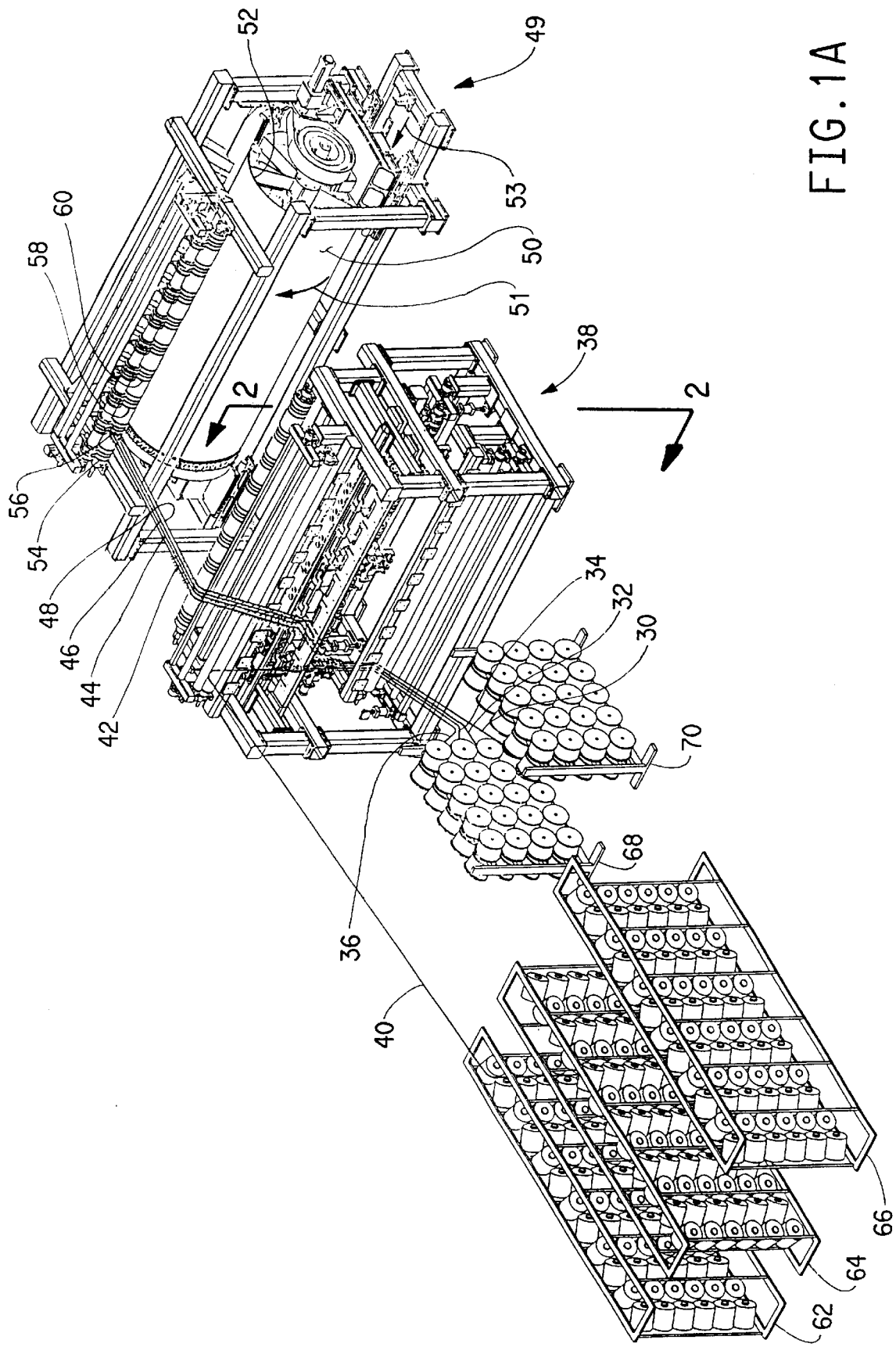

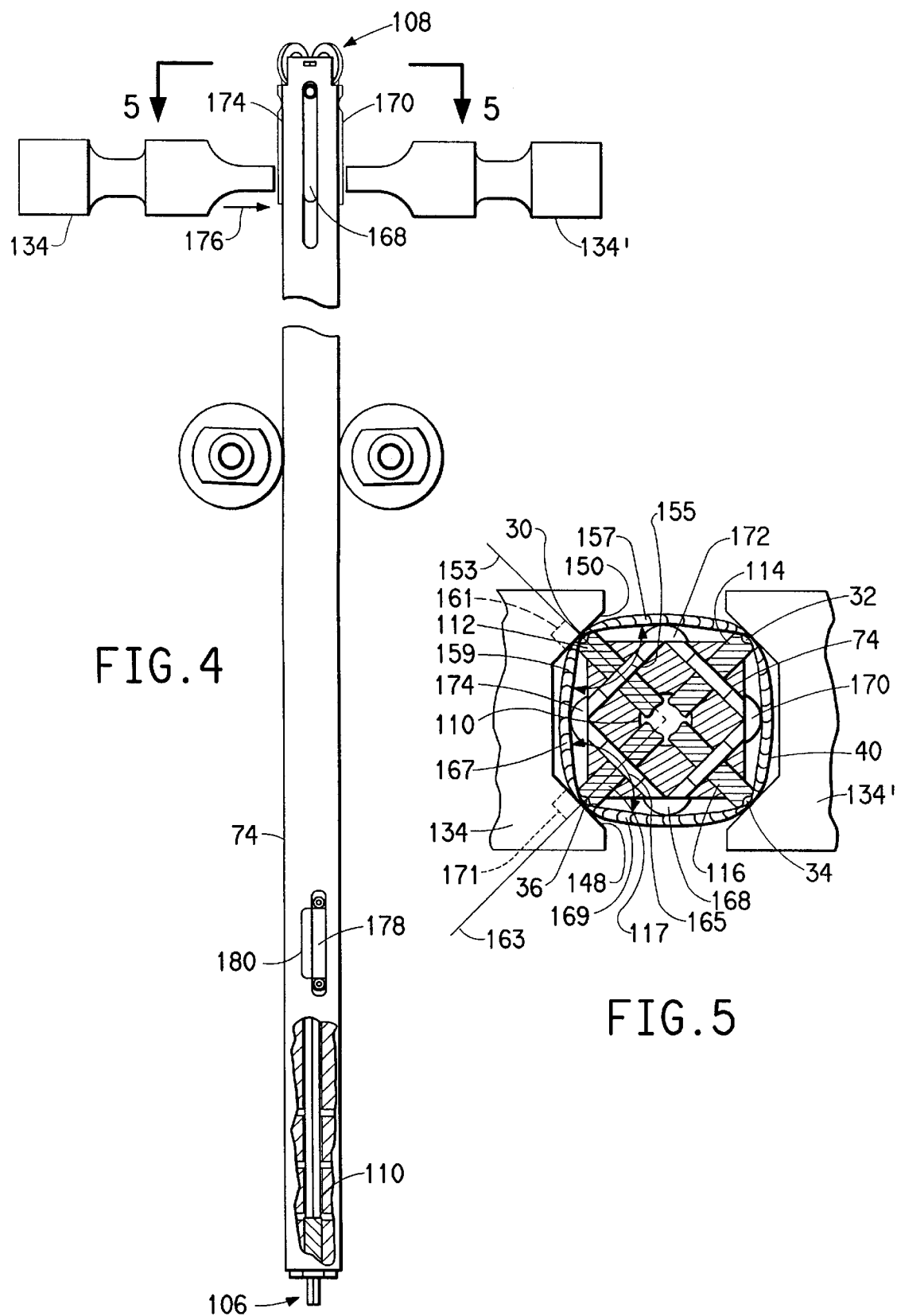

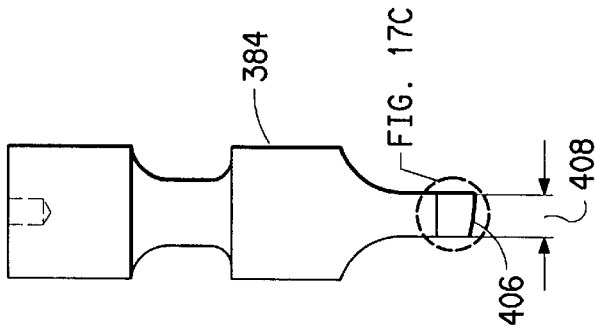
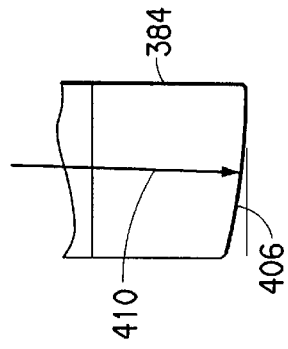
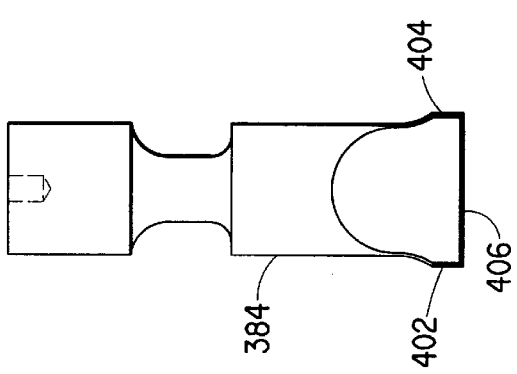
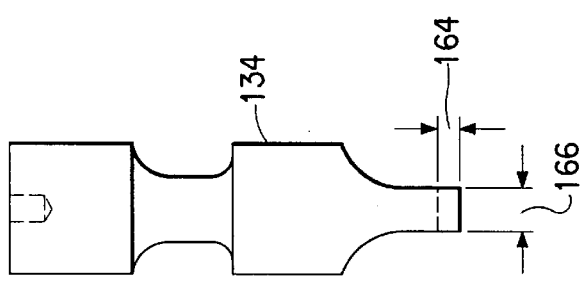
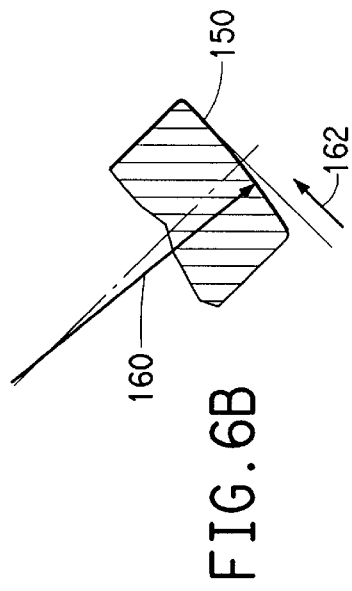
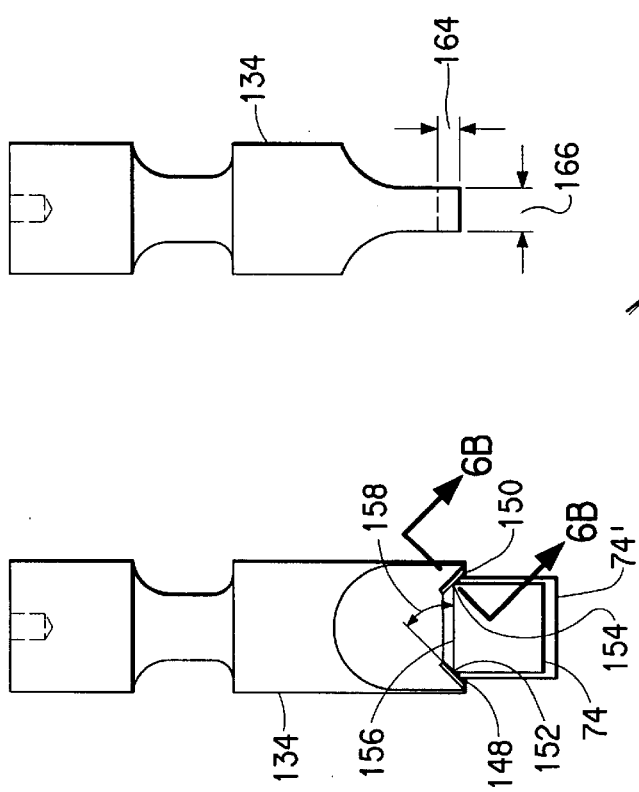

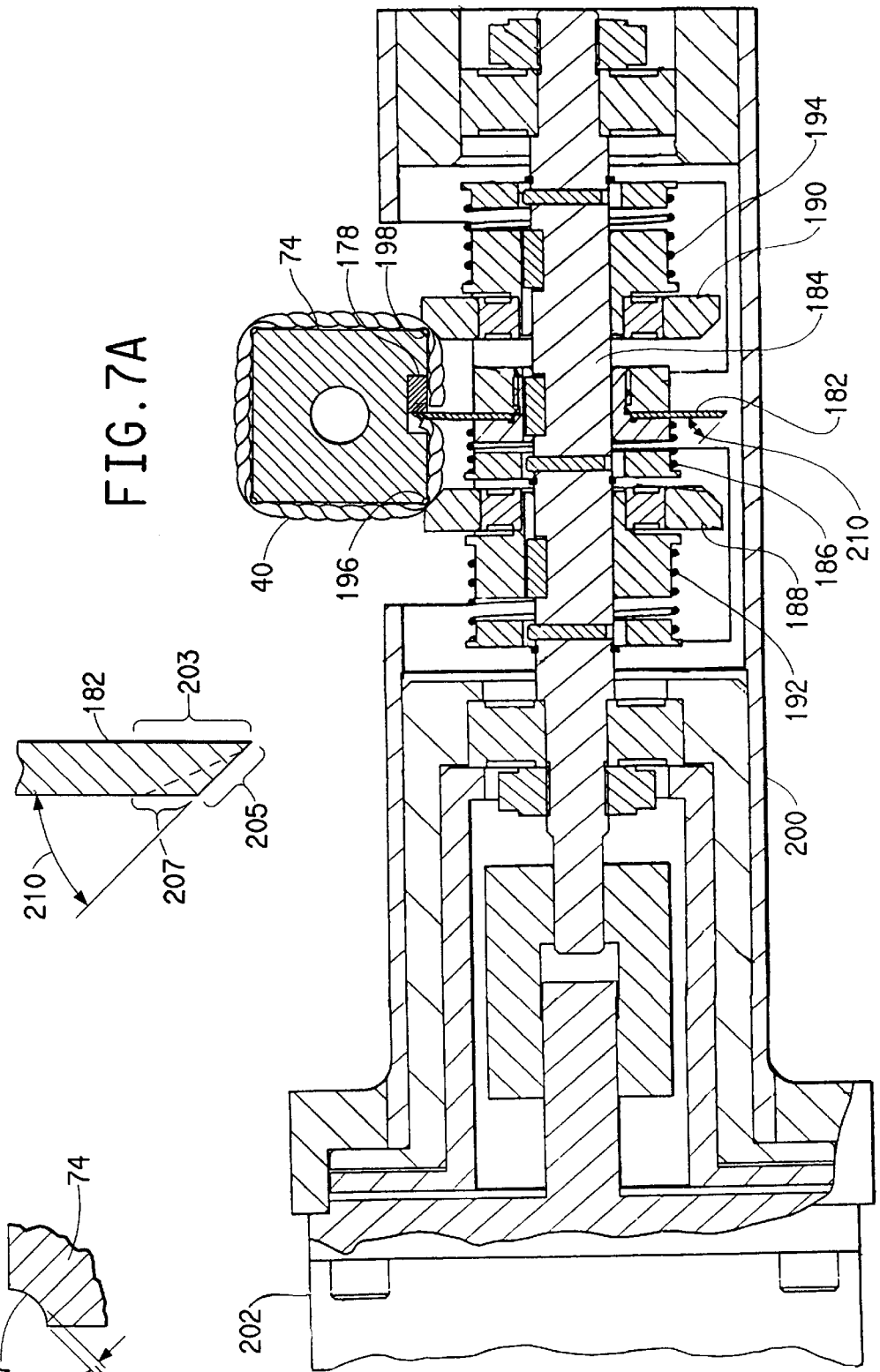

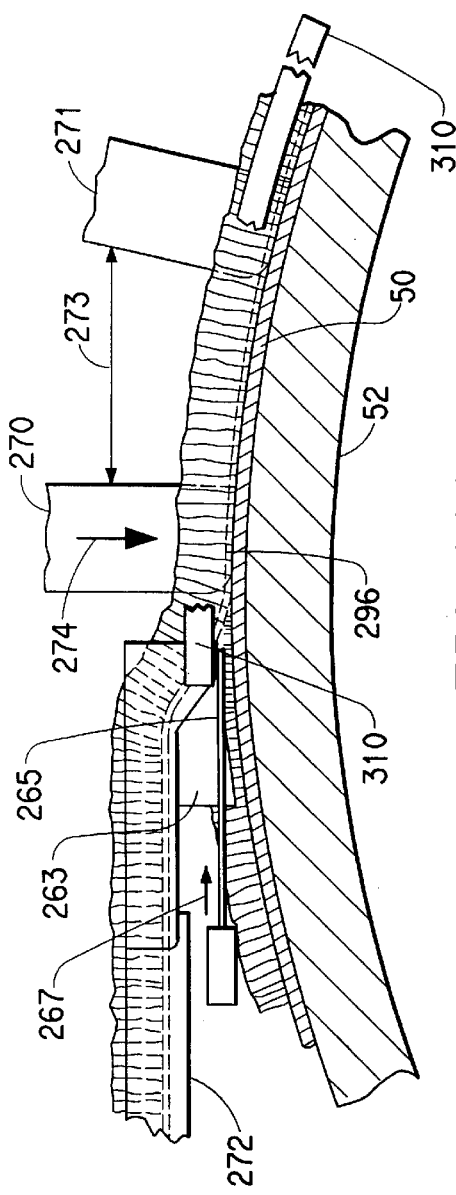
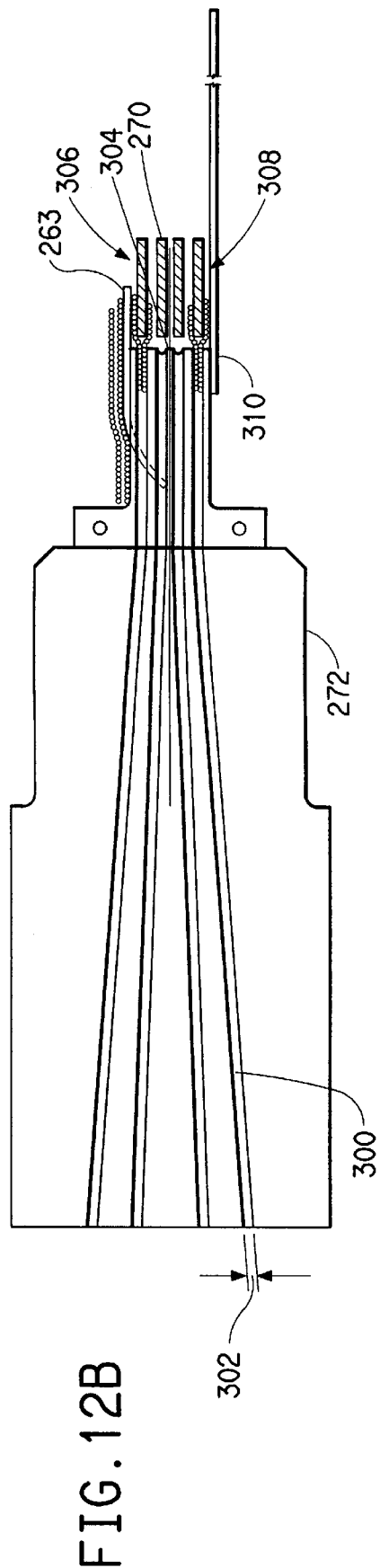
FIG. 12A
FIG. 12B

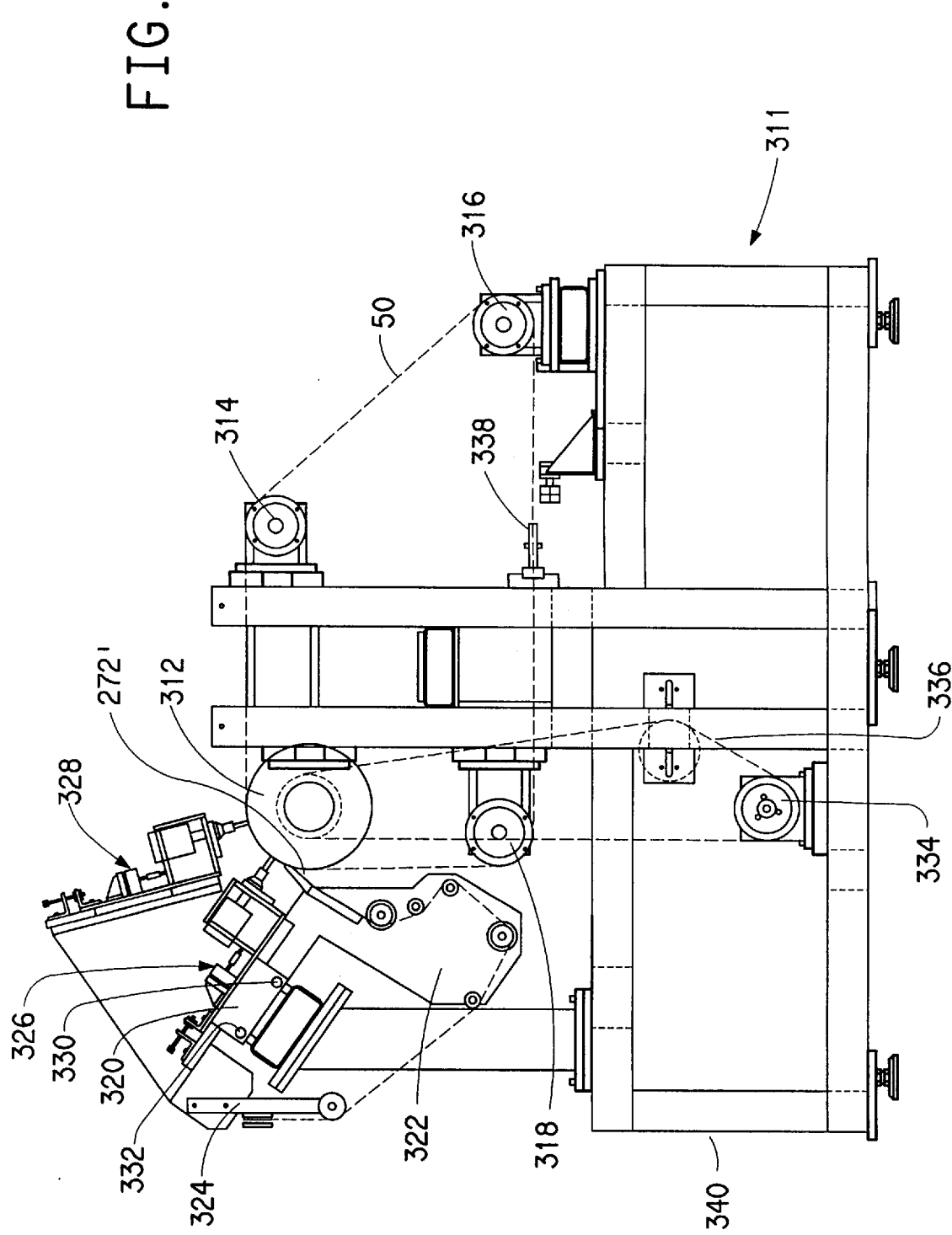

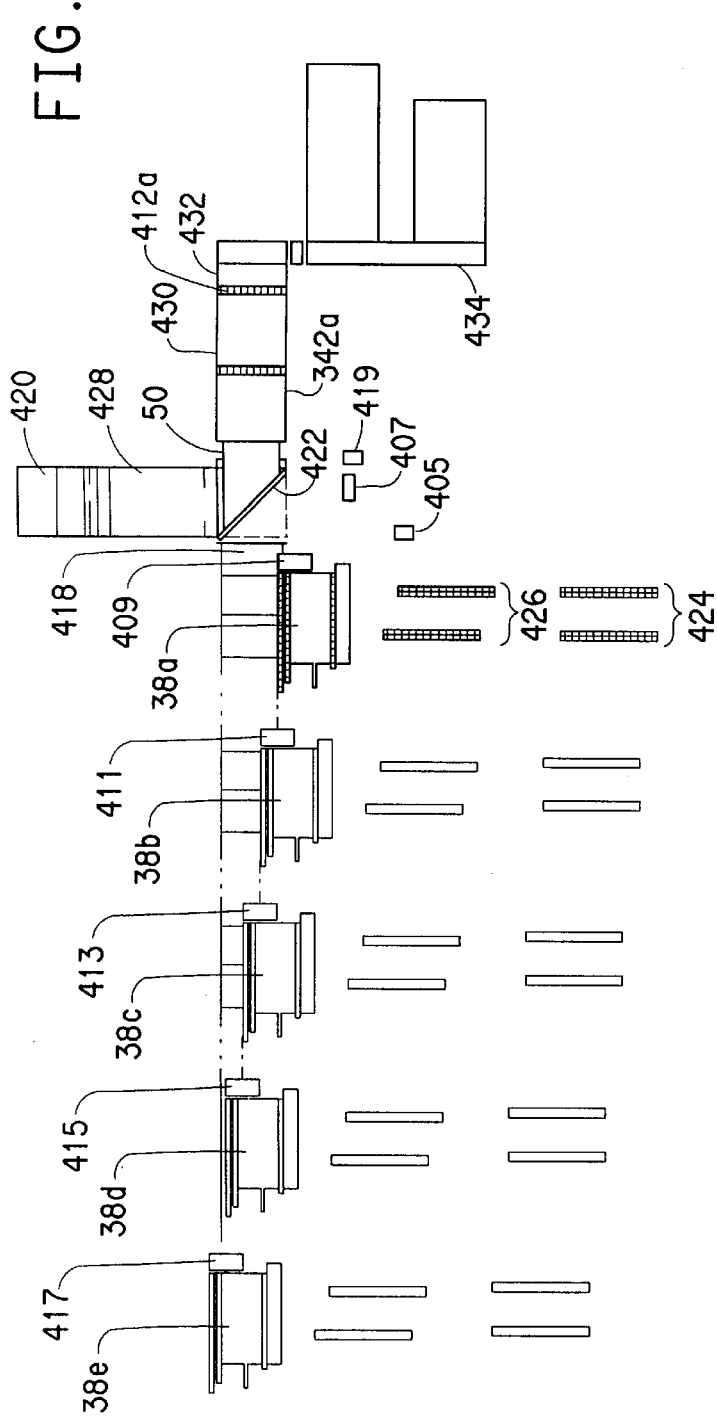
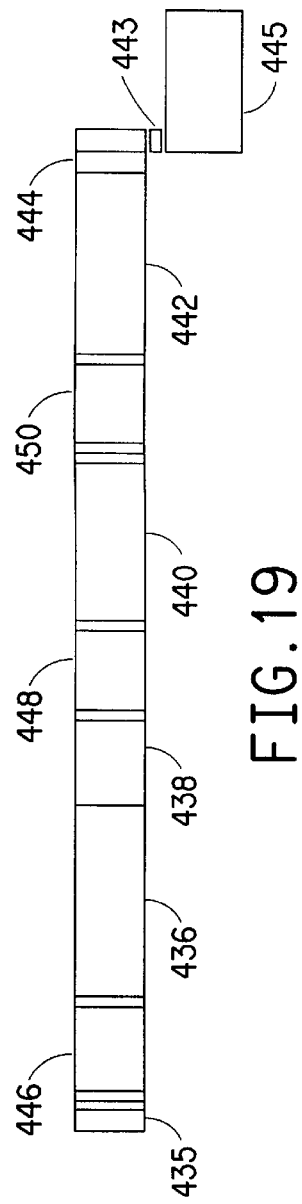

METHOD AND APPARATUS FOR MAKING A TUFTSTRING CARPET

This is a continuation, of application Ser. No. 08/513,734 filed Aug. 10, 1995, now abandoned, which is a CIP of Ser. No. 08/298,642 filed on Aug. 31, 1994, now abandoned.

BACKGROUND OF THE INVENTION

The present invention relates a method and apparatus for making pile articles that are useful as floor and wall covering when aligned with other pile articles and attached to a backing substrate to make a pile surface structure.

Conventional tufted carpets are made by passing a flexible woven primary backing through a machine having a large array of needles that force the carpet yarn through the backing where the yarn is restrained by a large array of hooks before the needle is retracted. There may be about 1400 needles across a 12' width. The backing must accommodate needle penetration without damage. The backing is then advanced a short distance (about 1/10" for a popular high quality tuft density), and the needles are reinserted through the backing to form the next series of tufts. A large array of cutters may be employed in conjunction with the hooks to cut the tuft loop inserted through the backing to produce a cut pile carpet. Friction holds the tufts in the backing after the needles and hooks have retracted and the backing moves to the next tuft position. This friction is insufficient to hold the tufts during use as a carpet, so an adhesive is applied in liberal quantities to embed all the filaments in the base of the tuft on the back side of the carpet (needle entry side) and attach them to the back of the primary backing. To assist in stabilizing, stiffening, strengthening, and protecting the tuft base from abrasion, this structure of tufts and primary backing has a secondary backing attached to the back of the primary backing which may be held by the same adhesive layer or by the application of more adhesive.

Alternative carpet constructions such as in Faris U.S. Pat. No. 2,475,019, Ahier U.S. Pat. No. 2,680,469, and Runton U.S. Pat. Nos. 2,698,044 and 2,698,045 have been suggested using composite chenilles attached to a backing without weaving. Certain versions of these alternate constructions omitted conventional backsizing and tuft binding.

Generally, the construction relied on the bulk application of adhesives that are messy to handle in the manufacturing process and are difficult to recycle when nylon polymer is used for the tufts. The machines suggested for such alternative construction were cumbersome to set up and operate, as they used a monolithic versus modular design to handle an entire carpet width of materials in a continuous coupled process. They also usually required discrete yarn supplies in a moveable creel to feed the process, and so required stopping for extensive yarn restocking at intervals or frequent stoppages to replace individual bobbins as they randomly ran out.

SUMMARY OF THE INVENTION

The invention is a method and apparatus for making a carpet by bonding a plurality of upright tufts of ply-twisted yarn to a strand to make a pile article and bonding a plurality of the pile articles side-by-side to a backing to form a carpet structure.

The yarn and strand are preferably assembled on a multisided (preferably four-sided) mandrel by winding one or two yarns around multiple strands (preferably four strands), bonding one or more strands at a time (preferably two strands) with a single ultrasonic horn, and cutting the yarn to provide a plurality (preferably four) of elongated pile articles, or tuftstrings, that are placed side-by-side with other tuftstrings and bonded to a backing to make a carpet structure. The carpets can be made in batches of one or several room sized carpets by supplying the backing on a drum or between spaced rolls and spirally wrapping several tuftstrings at a time across the backing; or the carpets can be made continuously by providing an endless supply of backing and a plurality of tuftstrings in the warp direction across the entire width of the backing. There is a distinct advantage in any case that fewer yarn ends need be provided in a stationary creel to complete a 12-foot wide carpet compared to conventional tufting machines. This reduces the size of the stationary yarn creel required for a carpet and reduces the time and manpower required to change the creel when changing carpet styles. This is particularly important when using pre-dyed yarns where the creel must be changed for every color change for the carpet.

The preferred method of making a carpet structure uses ultrasonic energy to bond the yarn to the strand and to bond the pile article or tuftstring thus formed to the backing. The invention includes methods and apparatii for accurately positioning the tuftstring and ultrasonically bonding multiple tuftstrings with a single ultrasonic horn operating from the top side or bottom side of the backing to secure the tuftstrings to the backing. The carpet making machines are modular in design for ease in fabrication, assembly, maintenance, and threadup.

BRIEF DESCRIPTION OF THE DRAWINGS

FIG. 1A is an isometric view of a batch system for making carpet using tuftstrings and a large drum.

FIG. 4 is a view partially in section of a tuftstring forming mandrel.

FIG. 5 is an enlarged section view of the end of the mandrel taken along line 5—5 of FIG. 4.

FIGS. 6A, 6B, and 6C are front, section, and side views of an ultrasonic horn useful with the mandrel of FIG. 4.

FIG. 7A is a section view of a cutter for cutting yarn on the mandrel.

FIG. 7B is an enlarged detail section view of the groove in the corners of the mandrel of FIG. 7A.

FIG. 7C is an enlarged view of the cutting edge of the blade of FIG. 7A.

FIGS. 12A and 12B show an elevation and a plan view, respectively, of a guide to direct multiple tuftstrings for bonding from the top side of the backing.

FIG. 14 is a side view of a belt module for bonding tuftstrings to an elongated endless belt of backing material.

FIGS. 17A, 17B, and 17C are different views of an ultrasonic horn useful for bonding tuftstrings to a backing from the bottom side of the backing.

FIG. 18 is a schematic plan view of a system for making a tuftstring carpet using a warp module.

FIG. 19 is a schematic plan view of a finishing system with bulking for a tuftstring carpet using pre-dyed face yarn.

DETAILED DESCRIPTION OF THE INVENTION

Figure 1B:
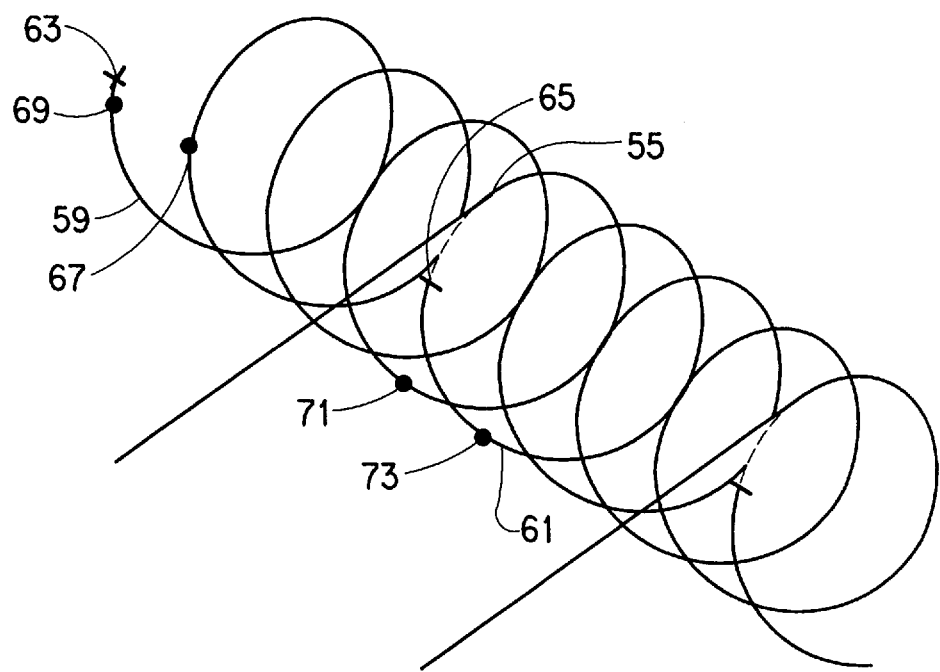
FIG. 1B is a schematic diagram of two groups of tuftstrings being spirally wound.

An embodiment chosen for purposes of illustration for making a full width carpet is shown in FIG. 1A and includes a tuftstring forming module 38 and a drum module 49 fed by yarn creels 62, 64, and 66, and strand creels 68 and 70. The carpet structure is formed by directing a plurality of strands, such as strands 30, 32, 34, and 36, along ridges on a mandrel in a tuftstring forming module 38 and winding yarn, such as yarn 40, around the mandrel and over the strands, bonding the yarn to the strands and cutting the yarn to make a plurality of elongated pile articles, or tuftstrings. A plurality of tuftstrings, such as tuftstrings 42, 44, 46, and 48 are arranged side-by-side and bonded to a backing substrate 50 supported on drum module 49. In this system, four tuftstrings are formed on a single mandrel at once, as will be explained below. Preferably, eight tuftstrings (only four shown) are grouped side-by-side at nine spaced locations, such as locations 54, 56, 58, and 60, across the face of a drum 52 in drum module 49. A clamp (not shown) inside the drum retains the ends of the backing during drum rotation while forming the carpet.

As each group of eight tuftstrings are guided onto the drum, the drum is rotated and moved laterally so the tuftstrings are pulled onto the backing and under a plurality of ultrasonic horns (not shown) which fusion bond the tuftstrings to the backing. As the drum continues to rotate in the direction of arrow 51 and move laterally in the direction of arrow 53, each group of eight tuftstrings forms a spiral array of tuftstrings on the drum 52. After one revolution of the drum, the just bonded tuftstrings in a group are adjacent the first bonded tuftstrings and are spaced from them at a distance equal to the space from one tuftstring to the next adjacent tuftstring in the group of eight, which is commonly 0.2 inches for a popular density of tufts. After 10 revolutions of the drum, the first group of eight tuftstrings will be aligned with the first bonded end of the second group of eight tuftstrings and an abutment of tuftstrings occurs at a butt joint. This condition exists from one group of tuftstrings to the next all across the drum so a completed carpet structure now exists on the drum. The drum rotation is now stopped, the tuftstring forming is stopped, and the butt joint is aligned with a cutting device. A plate slides under the tuftstrings and their respective bonders and lifts them off the drum. The cutting device traverses along the aligned butt joints and cuts all the tuftstrings and the backing to release the carpet from the drum to provide a 15-foot length of carpet that corresponds to the circumference of the drum. Another piece of backing can now be attached to the drum, the drum can be repositioned laterally to the start point, and the tuftstring forming and bonding to the backing can be restarted. The edges of the finished carpet can be trimmed to provide a square carpet 12'×15' while the next carpet is being made. FIG. 1B illustrates schematically how one group of tuftstrings 59 are spirally wrapped spaced from another adjacent group of tuftstrings 61. Group 59 has a starting point 63 and group 61 a starting point 65.

Group 59 is spirally wrapped so the just bonded tuftstrings, for instance, at position 67, are adjacent the already bonded tuftstrings, for instance, at position 69. Eventually, the just bonded tuftstrings of group 59 are also adjacent the already bonded tuftstrings of the adjacent group 61, such as at position 71 and position 73. Finally, the just bonded tuftstrings of group 59 at position 55 meet end-to-end with the starting point 65 for group 61, as shown, to form a butt joint. The process is then stopped, and the completed carpet structure is cut off the drum.

An entire carpet can be made this way using only 72 tuftstrings that may utilize only 18, 36, or 54 ends of yarn. In this discussion, 36 ends are used so two yarns are wrapped on a four tuftstring mandrel at one time, and the tuftstrings can be formed faster with more reasonable wrapping speeds than with only one yarn being wrapped. In addition, there is a beneficial random blending of yarn ends along the length of a tuftstring if multiple ends are used; in this way slight dye differences from one yarn end to another are blended along a tuftstring and from tuftstring to tuftstring which may reduce streaking defects due to dye differences. Three or more ends can be wrapped on a mandrel for further speed increases or styling flexibility as needed; the three ends can be different colors or types of yarn, for instance.

In FIG. 1A, three creel modules 62, 64, and 66 are shown for high productivity. One module holds 36 packages of yarn for running yarn ends and 36 packages for back-up ends that are tied in to the running packages using transfer tails in a conventional manner so an endless supply of yarn is available. Another creel module is shown for setup of yarn for a product change. The third creel module is available for further product change setups or for running with more ends for faster operation or styling variations as mentioned.

There are two strand creels, modules 68 and 70, shown holding a total of 80 packages of strand. Since the strand can be provided on large packages and it is consumed at a rate much slower than the yarn, additional packages for tie-in of transfer tails may not be needed. It is desirable not to twist the individual strands as they are being unwound so a rolling take-off is preferred for each package. Periodically, when stops are made to remove a bonded carpet from the drum, individual strand packages can be replenished at the same time as needed. More creel modules may be utilized so package changeover is facilitated. Usually, the strand is not changed for yarn product changes.

Figure 2:
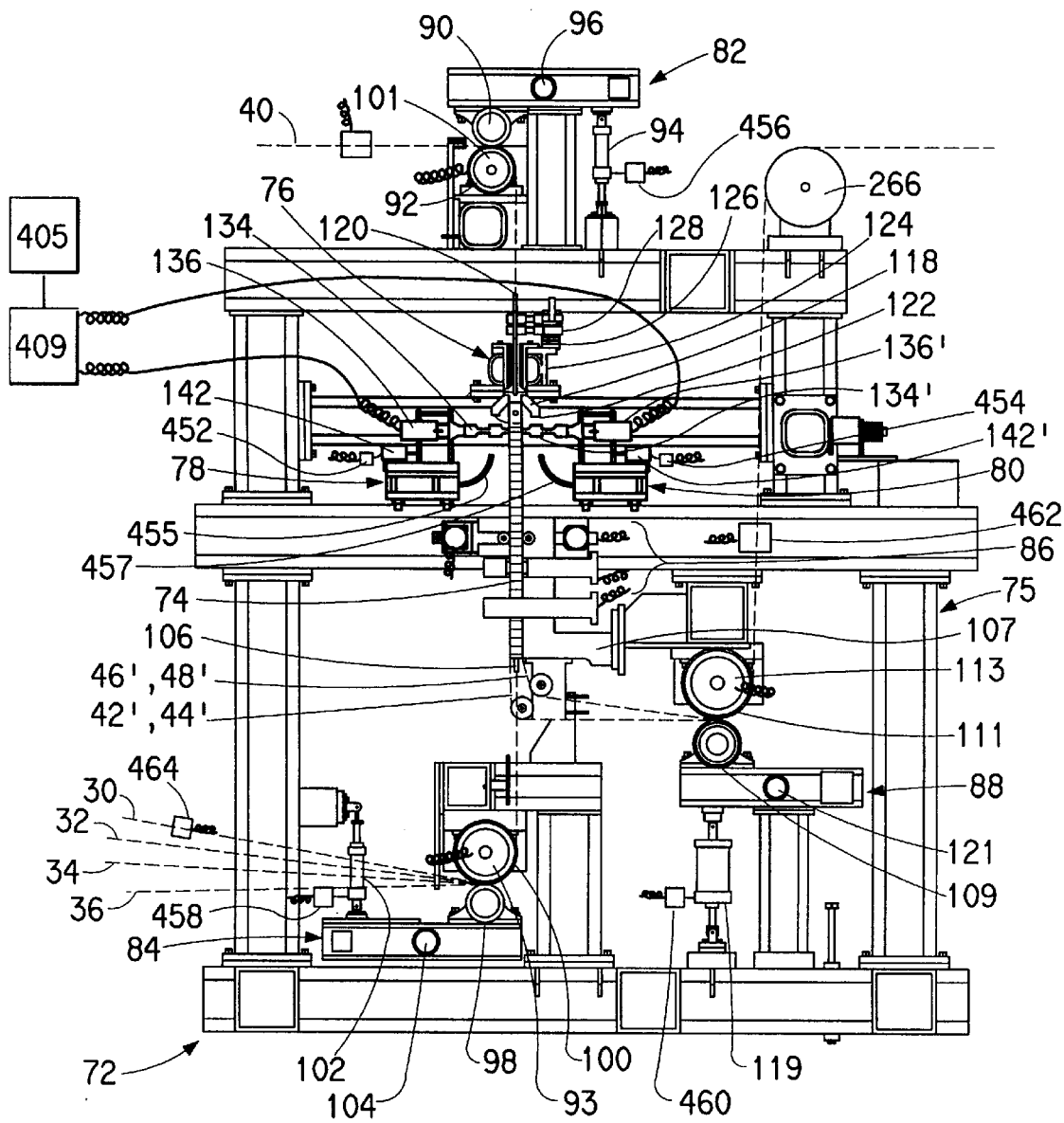
FIG. 2 is a side view 2—2 from FIG. 1A that is also typical for a single mandrel tuftstring former.

FIG. 2 shows end view 2—2 of the tuftstring forming module 38 and illustrates details of a basic single mandrel tuftstring former 72 using a four tuftstring mandrel 74. Major elements of the tuftstring former 72 are the four-sided mandrel 74, a frame 75, a yarn wrapper 76, two ultrasonic bonding modules 78 and 80, a yarn feed module 82, a strand feed module 84, a cutter arrangement 86, and a tuftstring drive module 88. Yarn 40 is fed in through an idler feed roll 90 and driven feed roll 92 that are nipped together by fluid cylinder 94 acting around pivot 96 to grip the yarn 40 that may comprise one or several yarn ends for each mandrel. Strands 30, 32, 34, and 36 are fed in through an idler feed roll 98 and driven feed roll 100 that are nipped together by fluid cylinder 102 acting around pivot 104 to grip the strands. Four strands are fed to the entrance end 106 of mandrel 74 where each strand is guided through a separate tube within a central hollow in the mandrel to keep the strands separated and prevent tangling. The mandrel is attached to frame 75 by bracket 107 on one side of the mandrel downstream from the cutter arrangement 86 that frees the wrapped yarn from the mandrel and forms four separate cut-pile tuftstrings. The tuftstrings 42', 44', 46', and 48' are fed through an idler exit roll 109 and driven exit roll 111 that are nipped together by fluid cylinder 119 acting around pivot 121 to grip the tuftstrings. Driven roll 111 has grooves to hold the "U"-shaped tuftstrings and idler roll 109 has ribs fitting into the grooves with the tuftstring therebetween.

FIG. 4 shows entrance end 106 of the mandrel where the strands enter and exit end 108 where the strands exit. FIG. 5 is an enlarged section view of the exit end that shows a turning pulley for each strand that guides the strand from a hollow passage 110 in the center of the mandrel 74. Pulley 112 guides strand 30, pulley 114 guides strand 32, pulley 116 guides strand 34, and pulley 117 guides strand 36. The strands are guided from the passage 110 to grooves on the corners of the mandrel as discussed below.

The yarn is wrapped around the mandrel, and over the support strands in the grooves on the corners of the mandrel, by wrapper 76 that comprises a hollow spindle 118 with a yarn entrance end 120 and a yarn exit end 122. The spindle is rotationally held by a bearing assembly 124 attached to frame 75. The spindle is rotated by a motor 126 acting through a pulley and belt arrangement 128. As the yarn 40 wraps around the mandrel 74, the strands 30, 32, 34, and 36 advance axially (downward) along the mandrel carrying the strands and yarn away from the wrapper and to the ultrasonic bonding modules 78 and 80.

Figure 3:
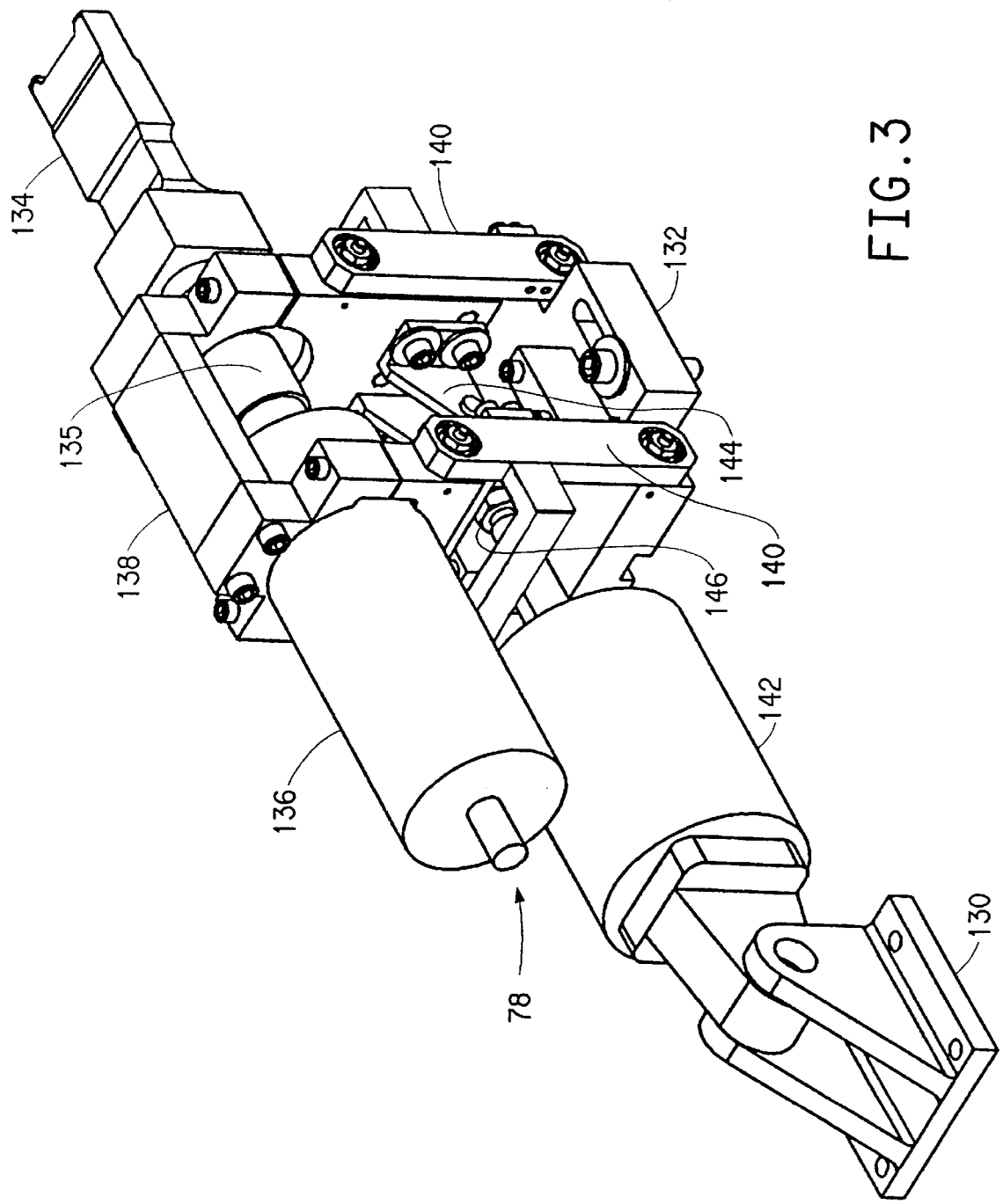
FIG. 3 is an isometric view of an ultrasonic bonding module.

FIG. 3 shows an isometric view of the bonding module 78 which is the same as module 80, both of which are attached to frame 75 in an aligned relationship on opposite sides of the mandrel 74 by brackets such as brackets 130 and 132. The basic bonding module comprises an ultrasonic horn 134 attached to a booster 135 and an ultrasonic driver 136 attached to frame 138. Frame 138 is attached to four-bar linkage assembly 140 (two bars shown) which is attached to bracket 132. Fluid cylinder 142 is attached to frame 138 by clevis bracket 144 on the rod end 146 and to bracket 130 on the cylinder end. Motion of the fluid cylinder rod end 146 causes the ultrasonic driver, booster, and horn assembly to move in a direction toward and away from the mandrel 74 while staying perpendicular to mandrel 74 to thereby squeeze the yarn between the horn and strand on the mandrel; the mandrel in this position acts as an ultrasonic anvil. Squeezing together of the yarn and strand while ultrasonic energy is applied to the horn causes the yarn and strand to rapidly heat, thereby causing the yarn filaments to fuse to each other and to the strand where they are in contact. The yarn does not stick to the horn nor does the strand stick to the mandrel. The fluid cylinder pressure determines the squeezing force exerted between the mandrel and horn and the yarn and strand therebetween. This force is an important factor determining the amount of ultrasonic energy coupled to the yarn and strand. Other factors are the horn vibrational amplitude and frequency.

FIGS. 6A–C shows the shape of the horn that permits one horn to bond two strands to the yarn at one time. In this way, only two horns are needed to bond the four strands guided along one four-sided mandrel. The horn 134 has two angled surfaces 148 and 150 that squeeze the yarn and strand (neither shown) against the corners 152 and 154, respectively, of the mandrel 74. The surfaces are long enough so that if a larger mandrel 74' is used, the same horn 134 can still engage the yarn and strand against the corners of the mandrel 74'. For a square mandrel as shown, the surfaces 148 and 150 are at 45 degrees to the side 156 of the mandrel as shown at 158. For a hexagonal mandrel with one horn bonding on two adjacent corners, this angle would be 30 degrees. The shape of the surface 150 (and surface 148) is shown in the enlarged section view in FIG. 6B to have an angled lead-in with a radius 160 to guide the yarn under the horn. The yarn would be traveling in the direction of arrow 162. In FIG. 6C, the depth 164 of the horn 134 is small to minimize horn stress created by the length of surfaces 148 and 150, and is large enough to clear all yarns expected to be used with the desired mandrel. The width 166 of the horn 134 is about 0.5 inches and is a function of the ultrasonic amplitude, frequency, and power of the driver.

Referring to FIG. 5, each horn, such as horn 134, is used to bond two support strands, such as strands 30 and 36, to the yarn 40 wrapped thereon. This is preferably done by arranging the angled surfaces 148 and 150 of horn 134 so they are essentially perpendicular to imaginary planes passing through the strands and bisecting the included angle defined by the yarn on the two sides of each strand. In this way, when the yarn is cut to form the cut pile tuftstring, the tufts on the sides of the strand form the same angle at the base of the tufts where they are bonded on. Imaginary plane 153 passes through strand 30 and bisects included angle 155 between the ends 157 and 159 of yarn 40 bent over strand 30. Surface 150 is essentially perpendicular to plane 153 as indicated at 161. Similarly, imaginary plane 163 passes through strand 36 and bisects included angle 165 between the ends 167 and 169 of yarn 40 bent over strand 36. Surface 148 is essentially perpendicular to plane 163 as indicated at 171. Notice that the imaginary planes 153 and 163 also intersect at the center or centroid of the cross-section of mandrel 74.

Referring to FIGS. 4 and 5, the yarn 40 is wrapped over four spacers 168, 170, 172, and 174 on the sides of the mandrel 74. The spacers are held in shallow slots in the sides of the mandrel. The purpose of the spacers is to increase the circumference of the mandrel seen by the yarn before the yarn is bonded. The spacers terminate at position 176 adjacent the horns 134 and 134'. If the yarn is nylon 6—6, it has been found that the yarn contracts significantly upon cooling from the ultrasonic heating, so as the yarn moves away from the horns, it passes beyond the spacers at 176 and can contract to a smaller circumference without binding on the mandrel.

After bonding, the yarn 40 must be cut to release it from the mandrel 74. When cut precisely midway between the strands, the cut end may determine the final tuft height of the yarn when the tuftstring is assembled into a carpet. When cut and assembled precisely, no further tuft shearing is needed in the final carpet product, although for some products, shearing may still be preferred. The cutter arrangement 86 in FIG. 2 consists of four rotating circular blades each bearing against a bed knife fixed to the mandrel. One such bed knife 178 is shown mounted in a slot 180 in mandrel 74 in FIG. 4. FIG. 7A shows section view 7—7 from FIG. 2. Circular blade 182 is rotationally keyed to shaft 184, is axially slideable along the shaft, and is urged by spring 186 against bed knife 178. Circular clamps 188 and 190, one on each side of the blade, hold the yarn and support strand securely in the grooves in the corner of the mandrel. The clamps are rotationally supported by, but are free of torque from shaft 184; and are axially slideable along the shaft. The clamps are free to rotate independently of the shaft driven by movement of the strand. Springs 192 and 194 urge clamps 188 and 190, respectively, toward corners 196 and 198, respectively, of the mandrel 74. The clamps securely hold the strand in the groove on the corners of the mandrel (and the yarn bonded to the strand) while the blades exert a cutting force on the face yarn to cut it. The shaft 184 is rotatably supported in housing 200 and is rotatably driven by motor 202 (partially shown). FIG. 7B shows an enlarged view of a groove 197 in the corner of mandrel 74. The groove has a depth 199. Depth 199 may be between about 25% and 75% of the thickness of the strand to securely hold it, and still not interfere with surfaces 148 and 150 of the horn during bonding, and still support the yarn free of the mandrel for transport along the mandrel before bonding.

Figure 8:
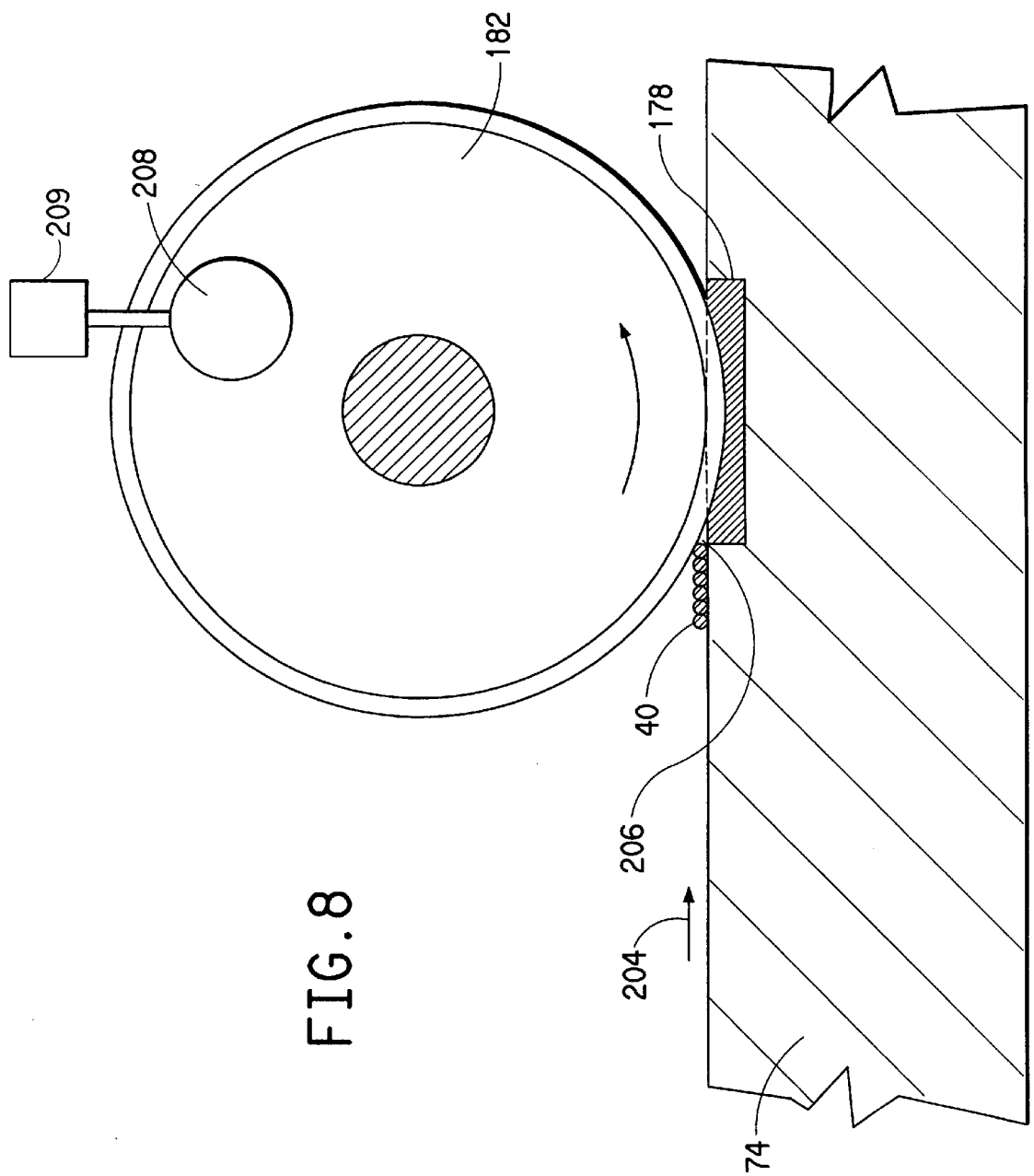
FIG. 8 is an enlarged detail section view of the cutter engagement with the mandrel of FIG. 7.

As the bonded yarn and strands are propelled along mandrel 74, the yarn is pulled against the rotating blade 182 which cuts the yarn as it is trapped between the blade and bed knife. FIG. 8 shows a schematic section view of blade 182, bed knife 178, mandrel 74, and yarn 40. The yarn is carried in the direction of arrow 204 into the intersection 206 between the blade and the bed knife where the blade cuts through the yarn. For efficient cutting of nylon 6—6 yarn, it has been found that a blade material of C-11 grade, submicron, tungsten carbide coated at the periphery with amorphous diamond (available from Tetrabond, Inc., Division of Multiarc, Inc. of Rockaway, N.J.) works well against a bed knife of D2 high speed tool steel. Referring to FIG. 7C, the portions of the blade that are preferably coated are portions 203, 205, and 207. The amorphous diamond coating has a Vickers hardness of about 6000 units. Another coating that may work well is a chemical vapor deposited coating of 2 microns of titanium carbide and a further coating of 2 microns of titanium nitride. Such a coating would have a Vickers hardness of about 2600 units. For improved life of the blade and bed knife surfaces, it has been found useful to apply a cooling lubricant of water and a yarn finish, such as an alkyl phosphate, to the surface of the blade using a felt applicator pad 208 kept moist by use of an intravenous-type drip system 209 or the like. Such a finish may be Zelex NK available from the E. I. DuPont Co. of Wilmington, DE and sold as an anti-static yarn finish. It is mixed with distilled water in a 0.5–2.0% volume ratio of finish in the mixture. The blade is believed to be most effective in cutting the yarn without undue wear by rotating the blade in the direction of yarn advance and at a peripheral speed slightly above (about 3–10%) the speed of the yarn passing under the blade. It is believed the low speed reduces the wear rate and the direction of rotation minimizes any yarn tension increase during cutting. This causes a shearing action versus a sawing action where the peripheral speed of the blade is a lot faster (about 500–1000% greater) than the yarn advance. However, acceptable cutting can occur when the blade is rotated in the direction opposite the yarn advance and/or at a high speed so a sawing action occurs. When using the shearing action, the cutting edge angle 210 (FIGS. 7A and 7C) on the blade is preferably about 75 degrees (45 degrees for sawing), and the finish on the coated portions 203, 205, and 207 of the cutting edge is about 1–2 microinches rms. Although a stationary bedknife and spring loaded blade have been described for urging the blade and bedknife together, it is possible to mount the blade 182 rigidly on shaft 184 and make the bedknife 178 moveable in mandrel 74 and spring loaded against the blade 182.

Figure 9:
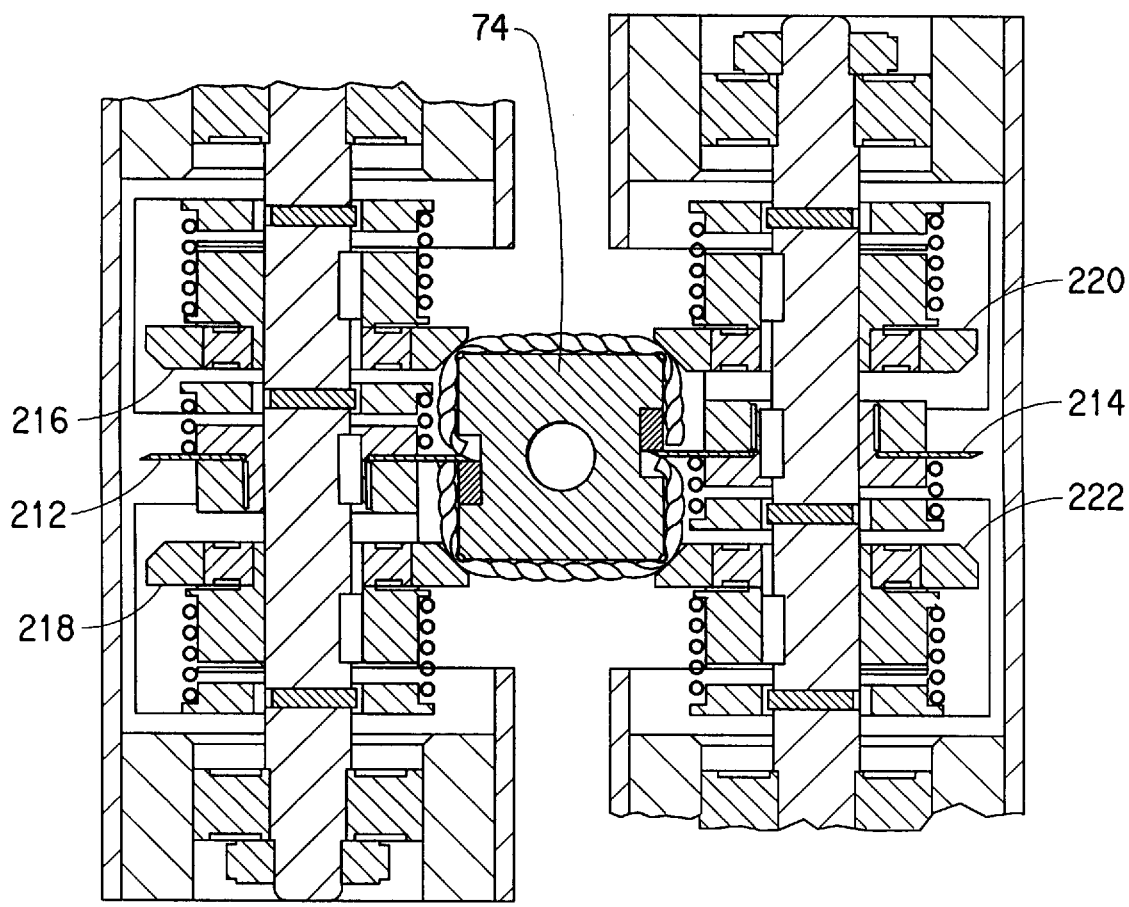
FIG. 9 is a section view taken from FIG. 2 of a dual cutter arrangement.

When cutting the yarns on the mandrel, two blades can cut the yarn on opposite sides of the mandrel at the same longitudinal position (and at the same time) since the cutters do not interfere with one another on opposite sides. The cuts can also be made by cutters spaced apart longitudinally along the mandrel. This is possible since the clamps hold the strand and attached yarn securely in the grooves on the corners of the mandrel as the cutters apply slight tension to the yarn during cutting. The clamps counter the tendency for this tension to pull the strand out of the groove. FIG. 9 shows two cutters with blades 212 and 214 that may be at the same longitudinal position on opposite sides of the mandrel 74. In these cases, as the cuts are being made, rotating clamps 216 and 218 hold the yarn cut by blade 212, and clamps 220 and 222 hold the yarn for blade 214. The clamps are shown aligned with the blade, but they would also work if arranged on a shaft separate from the blade and placed adjacent the upstream side of the blade closer to intersection 206 (FIG. 8) where the yarn is cut.

Figure 10:
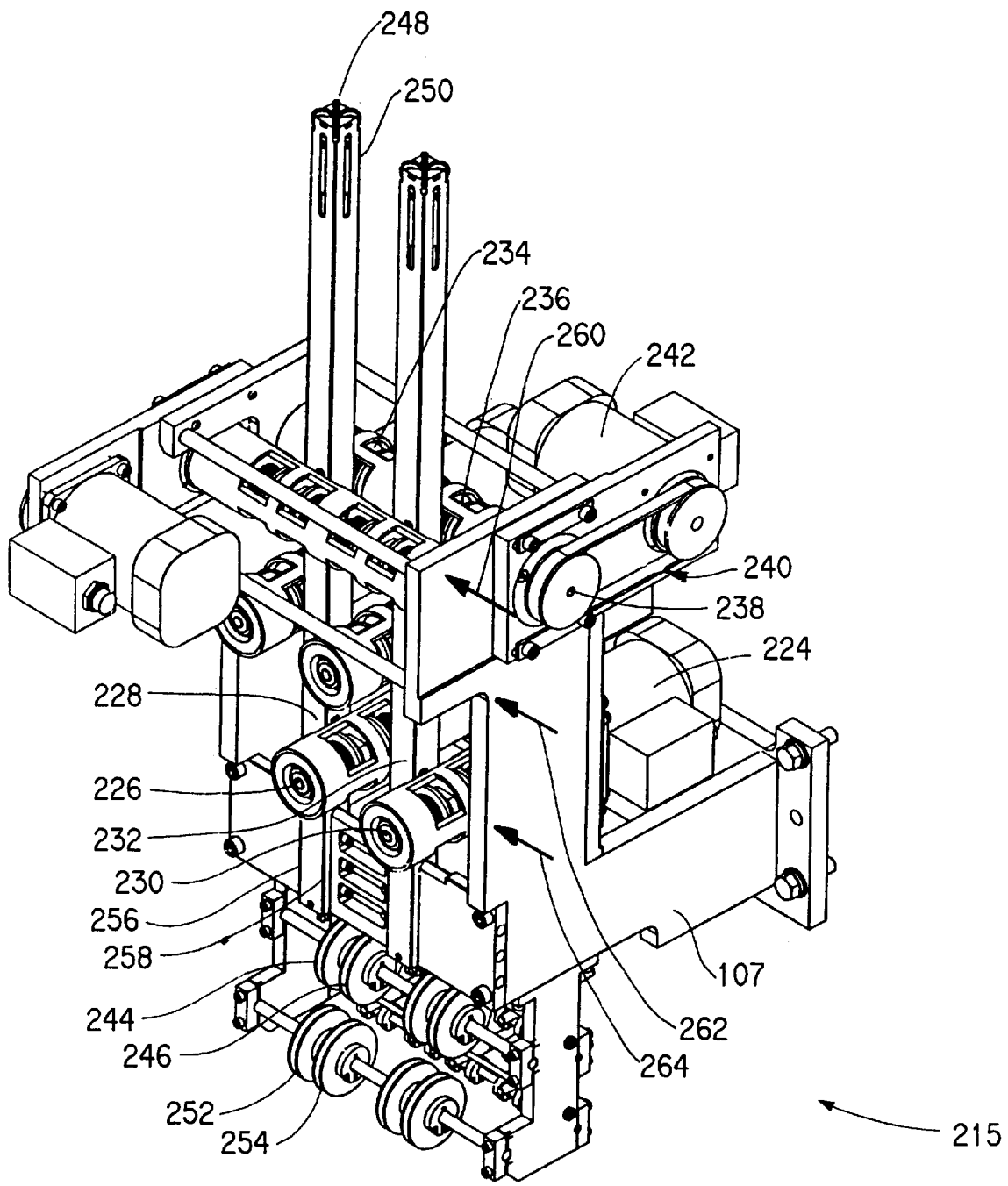
FIG. 10 is an isometric view of a dual mandrel module for making eight tuftstrings in a compact space.

FIG. 10 shows a two mandrel module 215 with cutters that can share drive motors for rotating the cutting shafts. In one arrangement, motor 224 can drive cutter shaft 230 for mandrel 232, and shaft 226 for mandrel 228 through a belt and pulley arrangement (not shown). In another arrangement, blade 234 for mandrel 228 and blade 236 for mandrel 232 can be mounted on the same shaft 238 driven through a belt and pulley arrangement 240 by motor 242. This arrangement of mandrels and cutters attached to bracket 107 makes a compact low cost module that can be easily handled for maintenance and servicing. In this arrangement, two cuts are first made on each mandrel at the same longitudinal position at arrow 260, followed by one cut on each at the position at arrow 262, then one cut each at the position at arrow 264. On a given mandrel, this cut sequence of 2:1:1 can be varied without affecting the production of the tuftstrings on a mandrel; for instance, other cut sequences may be 1:2:1 or 1:1:2. Other arrangements having more or fewer cutter motors, belt drives, and cutter shafts are possible without affecting the quality and operation of the two mandrel tuftstring module 215.

Referring to the bottom of FIG. 10, on the two mandrel module, there are a plurality of tuftstring guide pulleys. For mandrel 228, pulleys 244 and 246 guide the tuftstrings coming off mandrel corners 248 and 250, respectively; pulleys 252 and 254 guide the tuftstrings coming off mandrel corners 256 and 258, respectively. A similar arrangement of pulleys is present for mandrel 232. Each pulley has a groove to accept the tuftstring with the strand side toward the hub of the pulley and the tufts toward the periphery of the pulley. Each two mandrel module makes 8 tuftstrings.

Figure 11:
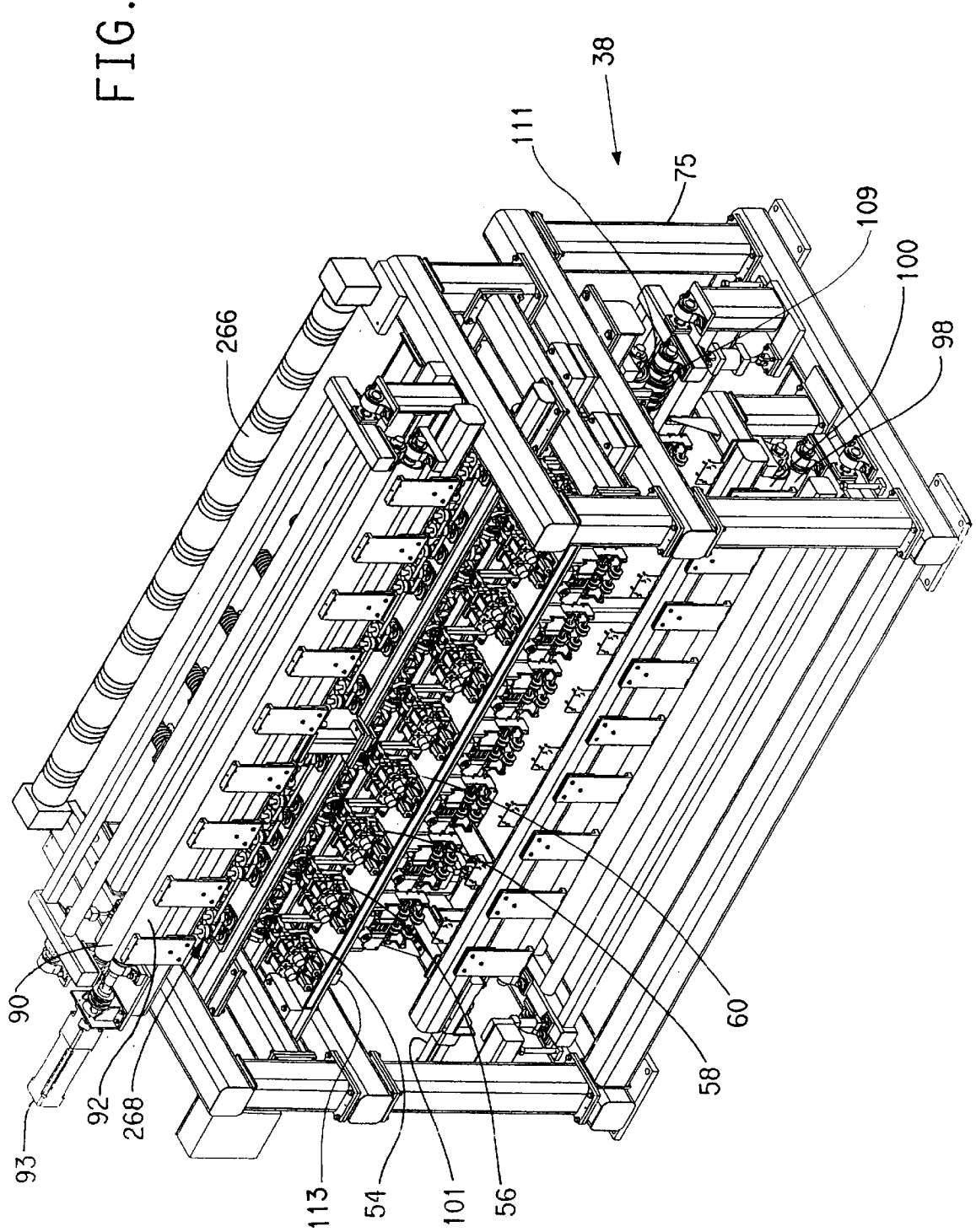
FIG. 11 is a front isometric view of an eighteen mandrel module for making 72 tuftstrings in a compact space.

FIG. 11 is a detail view of the tuftstring forming module 38 shown in FIG. 1. The two mandrel module 215 from FIG. 10 is shown in nine locations, such as locations 54, 56, 58, and 60 across the width of the forming module 38 to provide 72 tuftstrings. The forming module 38 has common inlet nip rolls for strand and common inlet nip rolls for the pile yarn for all 72 tuftstrings and common outlet nip rolls for the 72 tuftstrings. The strand inlet nip rolls were discussed referring to FIG. 2 and are shown as idler feed roll 90 and driven feed roll 92 rotated by motor 93. The yarn inlet nip rolls were discussed referring to FIG. 2 and are shown as idler feed roll 98 and driven feed roll 100 rotated by motor 101. The tuftstring outlet nip rolls were discussed referring to FIG. 2 and are shown as idler exit roll 109 and driven exit roll 111 rotated by motor 113. At the top of the forming module 38 is a tuftstring guide roll 266 for guiding the tuftstrings to the drum module 49 (FIG. 1A).

There can also be gang driving of the wrappers for the mandrels. For instance, one motor could drive 5 pairs of wrappers for 5 two mandrel modules, and one motor could drive 4 pairs of wrappers for the remaining 4 two mandrel modules. Such an arrangement could use a system of belts and pulleys, as partly shown in FIG. 11, at arrow 268. Frame 75 holds together all the elements of the tuftstring module 38.

Figure 13A:
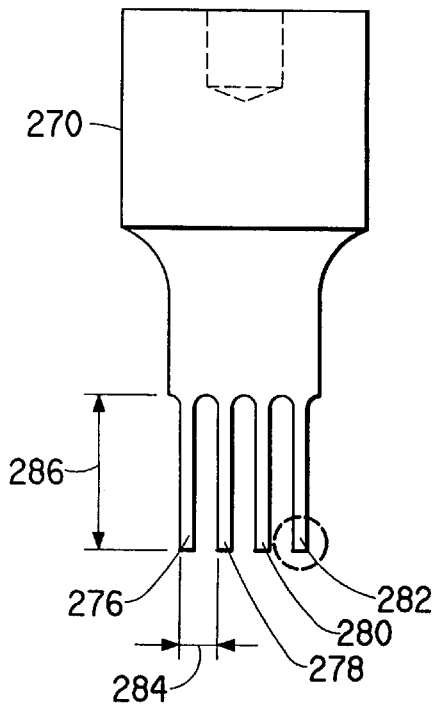
FIGS. 13A, 13B, 13C, 13D, and 13E are different views of an ultrasonic horn useful for bonding tuftstrings to a backing from the top side of the backing.
Figure 13B:
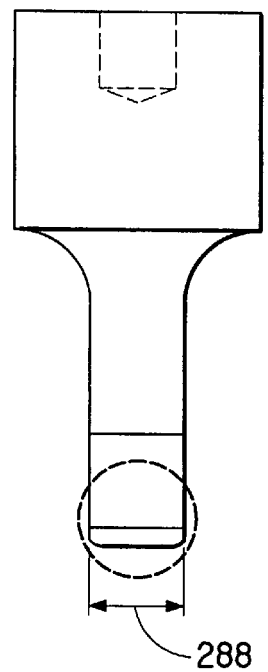
Figure 13C:
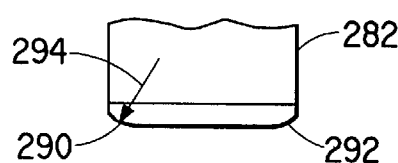
Figure 13D:
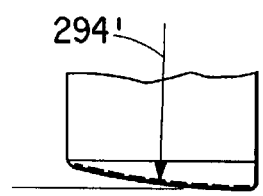
Figure 13E:
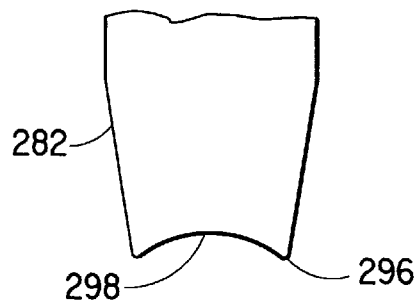

In the drum module 49, there are a plurality of tuftstring guides for accurately guiding the plurality of tuftstrings onto the backing and under the ultrasonic horns for bonding. FIG. 12A shows an enlarged side view of a first tuftstring bonding horn 270 and a second horn 271 for bonding closely spaced, multiple tuftstrings; and a tuftstring bonding guide 272 for guiding closely spaced, multiple tuftstrings into alignment with the first horn 270. Each horn is mounted into a bonding module similar to that shown in FIG. 3 for bonding the yarn to the support strand on the mandrel. Each horn is forced in a radial direction, such as shown by arrow 274 for horn 270, to squeeze the tuftstring against the backing substrate 50 and against the drum 52. The first horn is used to lightly tack the tuftstring to the backing while maintaining the alignment determined by guide 272, and horn 271 can apply more energy to the still heated tuftstring to securely attach it to the backing. A large amount of energy can be rapidly put into bonding the tuftstring by the additive effect of two horns. The distance 273 between horns 270 and 271 should be kept short to take advantage of this effect but this distance also provides some time for the heat from the first horn to penetrate the support strand. At low speeds where a lot of energy does not need to be added rapidly, only the first horn may be needed. This two-horn technique may also be useful when bonding the face yarn to the strand on the tuftstring forming mandrel. The horn 270, for instance, is shown in more detail in FIGS. 13A–E. The horn in FIG. 13A has four forks 276, 278, 280, and 282, each designed to fit between the tufts on a single tuftstring and contact the support strand at the base of the tufts. The spacing 284 between forks is the same as the desired tuftstring spacing on the finished carpet. For different tuftstring spacings, different horns would be used with corresponding fork spacings. The height 286 of the forks corresponds to the maximum length of the tufts on the tuftstrings for the desired maximum tuft height in the finished carpet. The horn has a length 288 in FIG. 13B that is a function of the ultrasonic amplitude, frequency, and power of the driver. FIG. 13C shows a typical detail of the leading end 290 and trailing end 292 of fork 282 that shows a slight radius 294 to help guide the tuftstring smoothly under the horn. FIG. 13D shows another possible shape of the fork where radius 294' extends the length of the fork so the pressure is gradually applied as the tuftstring slides under the horn. Other shapes may also be beneficial, and first horn 270 may have a different shape than second horn 271. FIG. 13E shows a typical detail of the profile of the tip 296 of fork 282 that has a concave surface 298 that guides the support strand along the length 288 of the fork to keep it from sliding to the side out from under the fork during bonding. This concave surface extends throughout the radius 290 and 294' to aid in tracking the tuftstring strand under the horn before the pressure and vibration of the horn acts on the tuftstring.

Referring to FIG. 12B, guide 272 has a plurality of slots, such as slot 300 that has a narrow width 302 that forces the tufts on the tuftstring in toward one another and over the support strand. The slots for the plurality to tuftstrings converge to a spacing that equals the desired spacing of the tuftstrings in the final carpet assembly. The slots guide the tuftstrings at the proper spacing to the horn that has forks at the same spacing and is closely spaced to the end 304 of the guide 272. The tuftstrings approach the horn at an angle of about 15 degrees to the surface of the drum so the concave surface in the horn helps in tracking the tuftstring. At the forks, the tufts for the tuftstring guided thereto separate so one row of tufts passes along one side of a fork and the other row passes along the other side of the fork and the tip of the fork 296 is over the support strand and pressing against it. On one side 306 of horn 270, the previously bonded tuftstrings must be pushed aside by plow 263 so individual tufts don't get trapped under the guided tuftstring and bonded under the horn. On the opposite side 308 of horn 270, there are usually no previously bonded tuftstrings present, so a support finger 310 is attached to guide 272 to support the outer tuft on that side of the horn. Finger 310 extends adjacent horn 271 and beyond to hold the tufts up until the bond cools. If the outer tuft is not supported by finger 310, it has been found that the outer tufts tend to lay over slightly during heating and as the bonded tuftstring cools so that in the final carpet assembly this row of tufts produces a visible "streak" different than adjacent rows, even after shearing of the tufts, so the carpet has a defect called rowiness.

After bonding is stopped on drum 52, the drum continues rotating a short distance and there is a plate 265 mounted under guide 272 that can be urged in the direction of arrow 267. The plate 265 is urged under the guided, but unbonded, tuftstrings and horns 270 and 271 so the guide, tuftstrings and horns can be lifted for tuftstring cutting, removal of the finished carpet, and threading of a fresh piece of backing onto the drum. The guide, tuftstrings, and horn can be lowered and the plate withdrawn so the tuftstrings are in place against the fresh backing and under the horn ready for bonding and restarting of the carpet making process.

FIG. 14 shows a side elevation view of a belt module 311 which is an alternate to the drum module where the endless loop of backing substrate 50 is supported by a plurality of rolls 312, 314, 316, and 318 instead of a single large drum 52 as in FIG. 1A. In this way, a large loop of backing can be accommodated for making a long piece of carpet without the expense of a large diameter drum. Roll 316 can be repositioned easily to change the length of the loop to suit the size of the carpet piece. The embodiment of FIG. 14 also traverses the groups of tuftstrings across the length of roll 312 which remains stationary compared to the embodiment of FIG. 1A where the tuftstrings remained stationary and the drum traversed the distance between groups of tuftstrings. Carriage 320 carries tuftstring guide assemblies 322 and 324, first bonder module 326, second bonder module 328, and tuftstring bonding guide 272'. The bonder modules are similar to those shown in FIG. 5, but with the horn of FIG. 13A. Carriage 320 is supported by stationary rod 330 and rotatable threaded rod 332 that is driven by an attached motor (not shown); the threaded rod engages a threaded nut in the carriage 320. Motor 334 drives roll 312 through a belt and pulley system 336. One or more of rolls 314, 316, and 318 may be slightly crowned to keep the backing substrate tracking in a fixed position on the support rolls. An edge guide for the backing, such as edge guide 338, may also aid in tracking. Frame 340 supports all the elements of belt module 311. When operating the system of FIG. 1A, but using the belt module 311, it would be desirable to orient the belt module 90 degrees to the direction of the illustrated tuftstrings 42, 44, 46, and 48 so they would be aligned with the direction of travel of traversing carriage 320 so the angle of the tuftstrings would not change during traversing.

Belt module 311 can be operated with a plurality of groups of tuftstrings as described with reference to FIG. 1A, or it can be operated with only one group of tuftstrings which are traversed across the entire length of roll 312 which acts as the ultrasonic anvil for this module. In this way, only very few tuftstring are required to be made and only very few face yarn supply packages and support strand packages are needed. This results in a low cost carpet assembly system, but one which has much lower productivity than the one shown in FIG. 1A. For some situations, this may be preferred. For instance, if it is desired to manufacture carpet at the place of sale, the low cost compact advantages of this mode of operation may be particularly desired.

Figure 15:
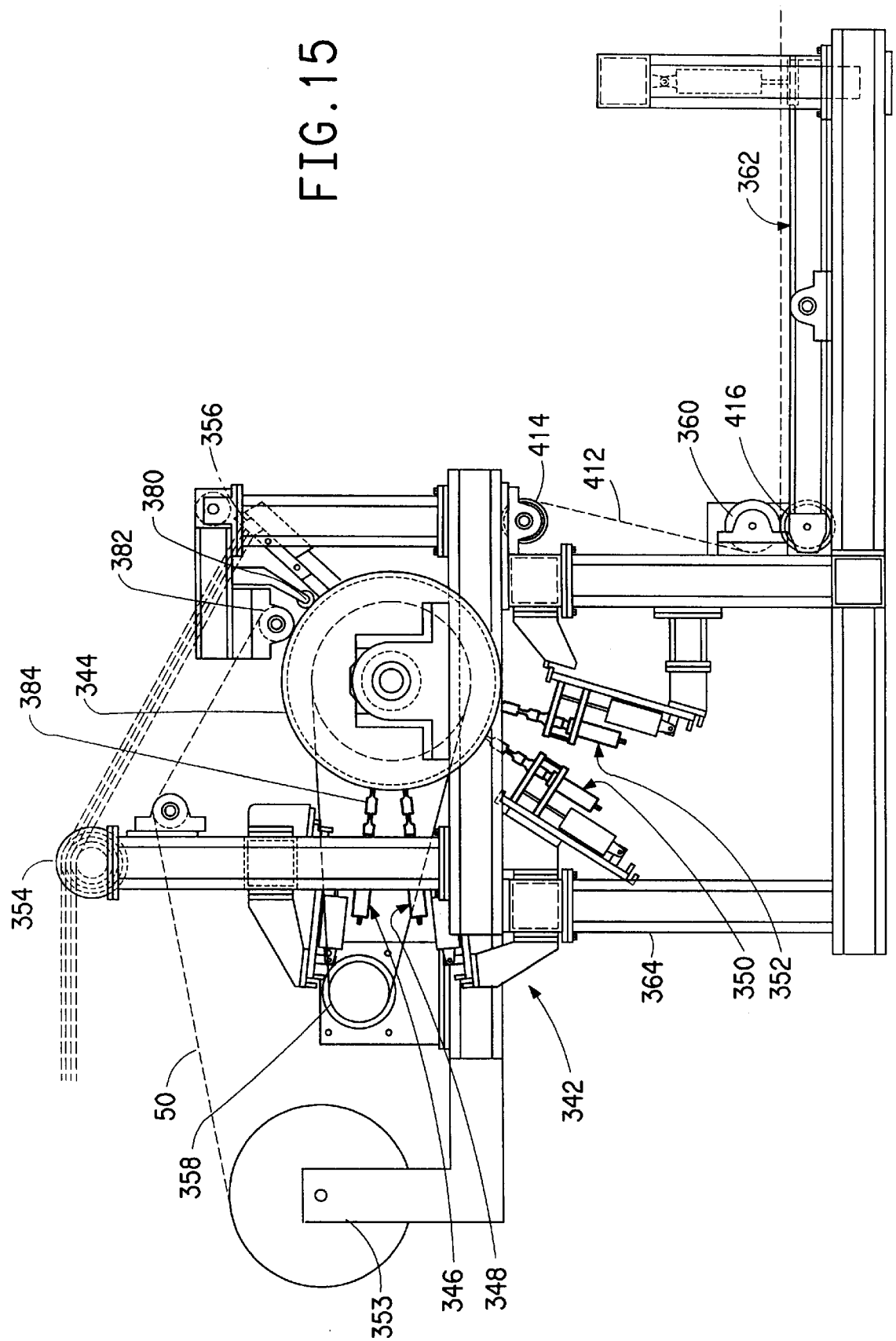
FIG. 15 is a side view of a warp module for bonding tuftstrings to an elongated roll of backing material.

FIG. 15 shows a side elevation of a warp module 342 which is an alternative to the drum module 49 and belt module 311 discussed. In the warp module 342, a plurality of tuftstrings necessary for an entire width of carpet are guided to a bonding roll 344 where they are joined with and bonded to an elongated roll of backing substrate 50 to make an entire roll of carpet; or if the backing can be spliced to provide an endless supply, the support strand can be spliced to provide an endless supply, and the carpet can be transversely cut on the fly; the process can run making carpet continuously. The carpet can be wound into rolls or cut to discrete lengths and stacked. If it is desired to make a full 12-foot wide carpet, the number of tuftstring modules 38 shown in FIG. 1A must be increased to ten to provide about 720 tuftstrings and the number of face yarn creels, such as 62, and support strand creels, such as 68, must be increased accordingly. Alternatively, additional two-mandrel modules can be added to the tuftstring forming module 38 so only five of these modified modules 38 would be required.

In FIG. 15, the warp module could use the top side bonding technique discussed where the tuftstring is guided under a forked horn, or back side bonding can be used as will be discussed referring to FIGS. 15 and 16A–D. The warp module 342 comprises a bonding roll 344; a plurality of bonder modules, such as 346, 348, 350, and 352; backing substrate support 353; tuftstring guide modules 354 and 356; bonder roll drive motor 358; carpet drive roll 360 and carpet nip assembly 362; all mounted to frame 364.

Figure 16A:
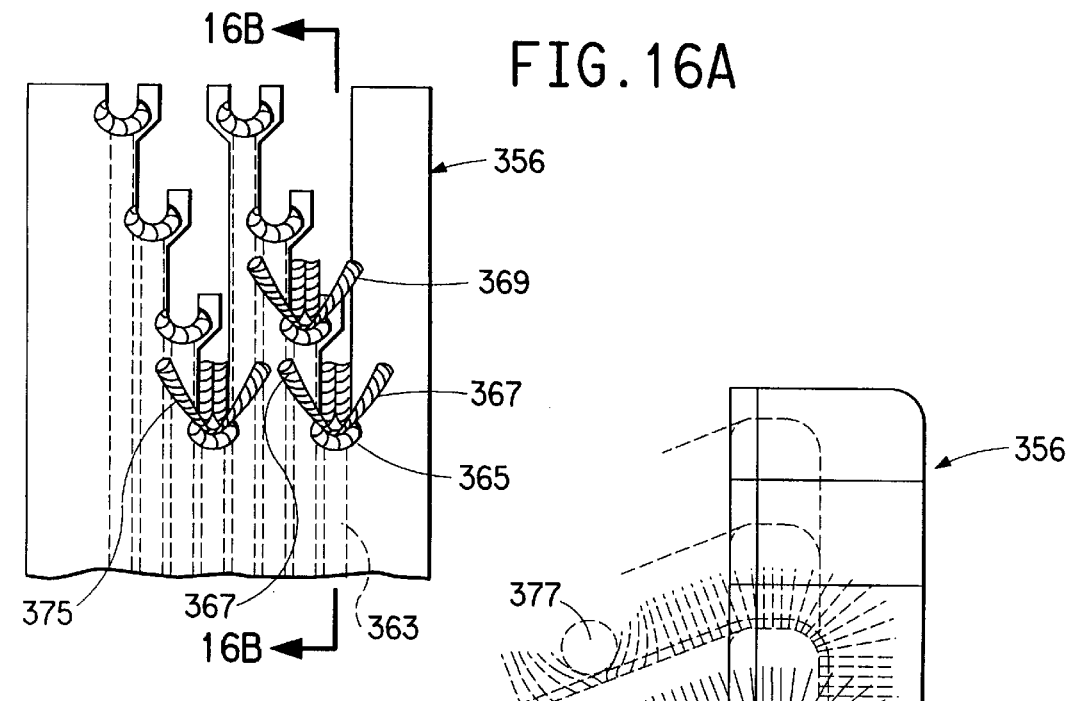
FIGS. 16A, 16B, 16C, and 16D are different views of a guide to direct multiple tuftstrings for bonding from the bottom side of the backing.

The tuftstrings coming from tuftstring modules 38 are first guided at four spaced elevations in guide module 354 which spaces the tuftstrings close to their final spacing desired in the carpet structure. Four adjacent tuftstrings are each at a different elevation for ease of handling and to prevent entanglement. The guide 354 comprises a stationary roll with different depth slots; the roll can be periodically rotated a partial turn to distribute wear. The tuftstrings are maintained at their guided elevations in guide module 356 where the final tuftstring-to-tuftstring spacing desired in the carpet is achieved. FIG. 16A shows channels, such as lower channel 363, in guide module 356. Each channel has a radiused entrance, such as entrance 365 in channel 363 to guide the tufts, such as tufts pairs 367, 369, and 375, from their angled orientation to a parallel orientation as shown.

It is important that the tuftstring is angled down at angle 371 over part of the radius 373 of radiused entrance 365 so the tufts "fan out" as they enter guide 356 and are free of entanglement with other tufts on the tuftstring. This angle should be between about 5–45 degrees, and preferably, about 20 degrees. It is important that the tuftstrings are kept separated from and free of entanglement with one another as they enter guide 356. This is accomplished by the multilevel staggered approach to the guide. For instance, for the tuft pairs 367 and 375 as shown, every fourth tuftstring is at the same level which spaces them apart far enough that the tufts 367 are free of entanglement with tufts 375. Adjacent tuftstrings 367 and 369 are staggered apart vertically by a sufficient distance so tufts 367 are free of entanglement with tufts 369. A plurality of round rods, such as rod 377 and 379, are placed ahead of guide 356 to gently brush against the tufts at the different levels (only two shown) to prevent the tuftstrings from twisting from an upright orientation as they approach guide 356; this insures the tuftstring strand will be centered in the channels 363 of guide 356.

Figure 16B:
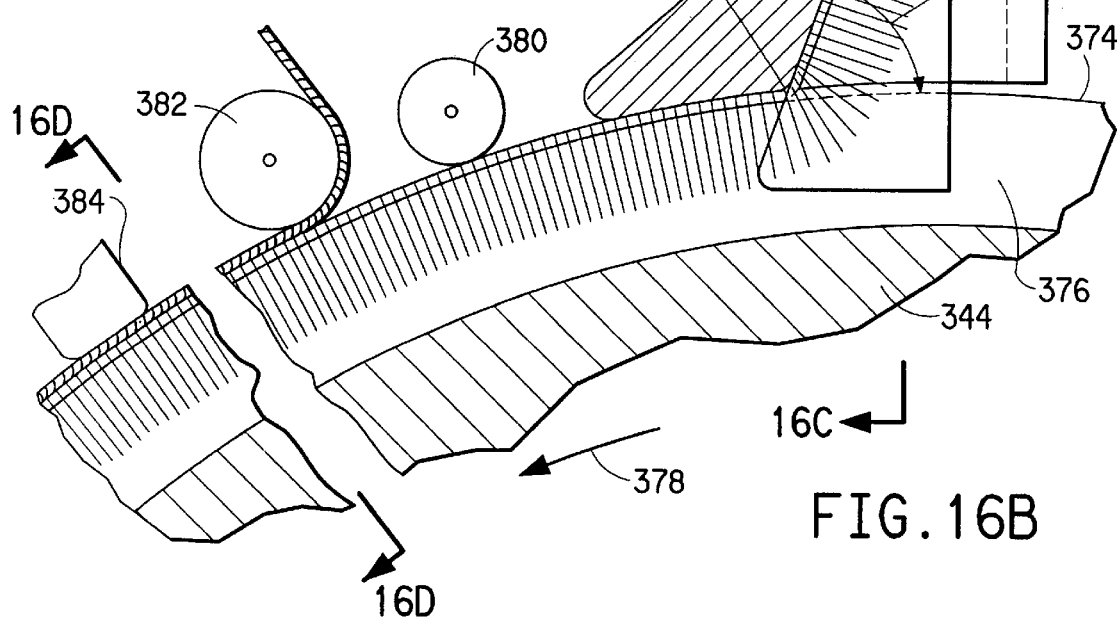

Guide module 356 guides the tuftstrings into grooves on bonding roll 344 with the tufts facing down into the groove and the support strand supported on the top of ribs separating the grooves. FIG. 16B shows a side section of guide 356 and a portion of bonding roll 344. A tuftstring, such as tuftstring 48, first makes an angled turn over radiused entrance 365 and radiused corner 366, passes down along channel 363, past a plow 370, makes another angled turn at 372 over a radiused corner at the end 396 of the bottom of channel 363, and is guided onto rib 374 with the tufts down in grooves on each side of the rib, such as groove 376. The bonding roll 344 is rotating in the direction of arrow 378. It is important that the tuftstring makes an abrupt turn approaching rib 374 as defined by angle 372 so the tufts quickly and forcefully pass from the guide to the roll over a short distance to avoid problems getting the tufts into and remaining in the grooves, such as groove 376. Angle 372 should be between about 45 to 135 degrees, preferably about 90 degrees. To further insure the tuftstrings are securely in the groove and the strand is against rib 374, a roller 380 may be used to press the tuftstrings against roll 344. Tension in the tuftstrings that are bent at the radius of roll 344 keeps the tuftstrings in place on roll 344 until the backing is in place. The backing 50 is guided around guide roll 382 that contacts the back of the tuftstrings on roll 344. The backing is under tension which holds the tuftstrings and backing in place on roll 344 until bonding horns, such as horn 384 can bond the backing to the tuftstring with the ribs on roll 344 acting as ultrasonic anvils.

Figure 16C:
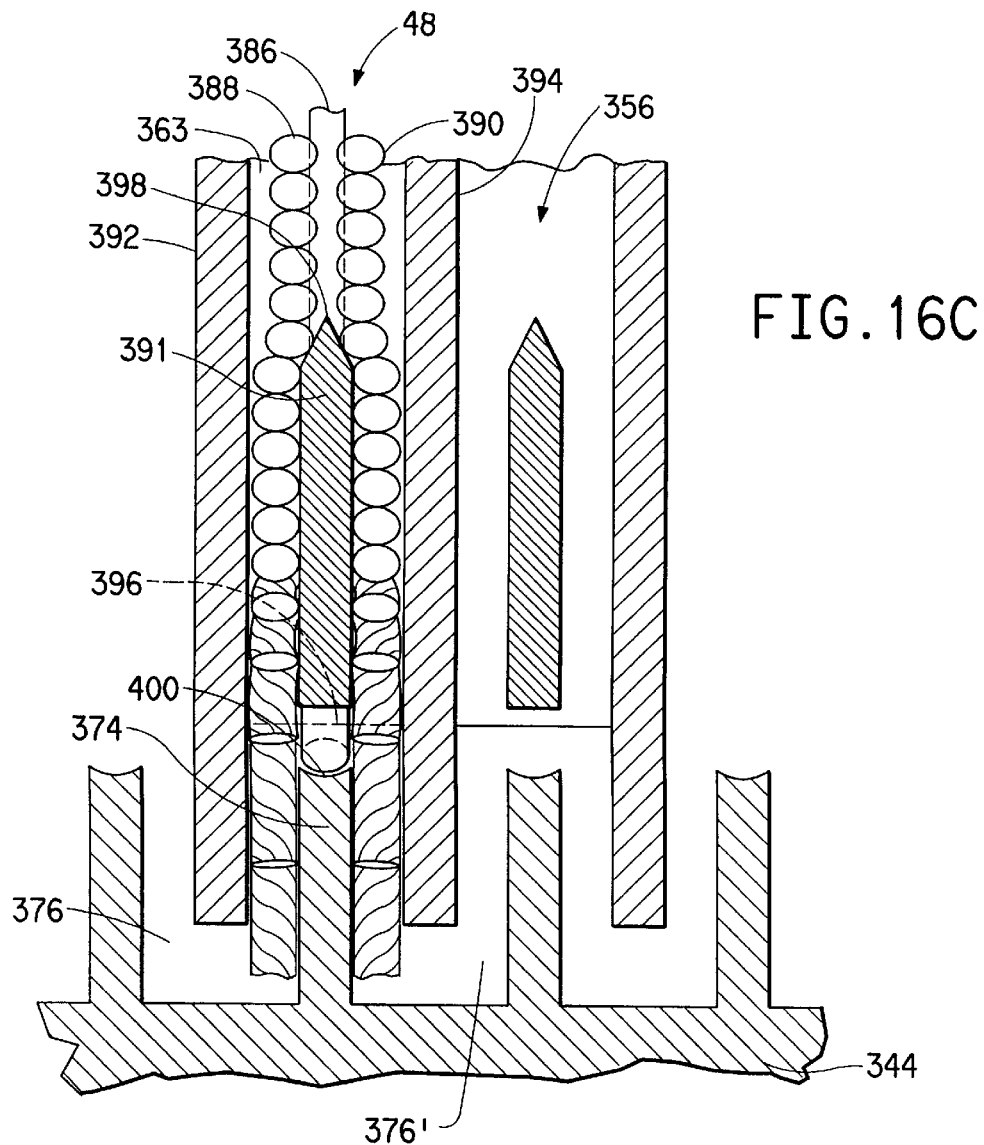

FIG. 16C shows another view of how the tuftstrings are guided from the channels in guide 356 to the grooves in bonding roll 344. For instance, tuftstring 48, comprised of support strand 386 and first row of tufts 388 and second row of tufts 390, passes downward through channel 363 toward fin 391, which is one of a plurality of fins on plow 370. The tuftstring is omitted in the adjacent channel for clarity. The channel 363 is formed between parallel plates 392 and 394 which extend down beyond the end 396 of the bottom of the channel 363 and into the grooves on roll 344. Plate 392 extends into groove 376 and plate 394 extends into groove 376'. Rib 374 extends between the ends of plates 392 and 394 that extend into the grooves. Fin 391 is aligned with rib 374 and extends along channel 363 to separate the rows of tufts 388 and 390 before they reach rib 374. Fin 391 has a pointed end 398 facing opposite the direction of travel of the tuftstrings to help separate the rows of tufts as they pass by. The top of rib 374 has a concave surface 400 to receive the support strand and keep the strand from falling off the top of the rib and into one of the adjacent grooves. If the spacing from one tuftstring to another (pitch or gage) is to be changed in the final carpet structure, the guide module 356 and bonding roll 344 would be changed and replaced with a guide and roll having the new spacing. Guide 354 may not need to be changed if the necessary number of slots for tuftstrings are provided in the first place.

Figure 16D:
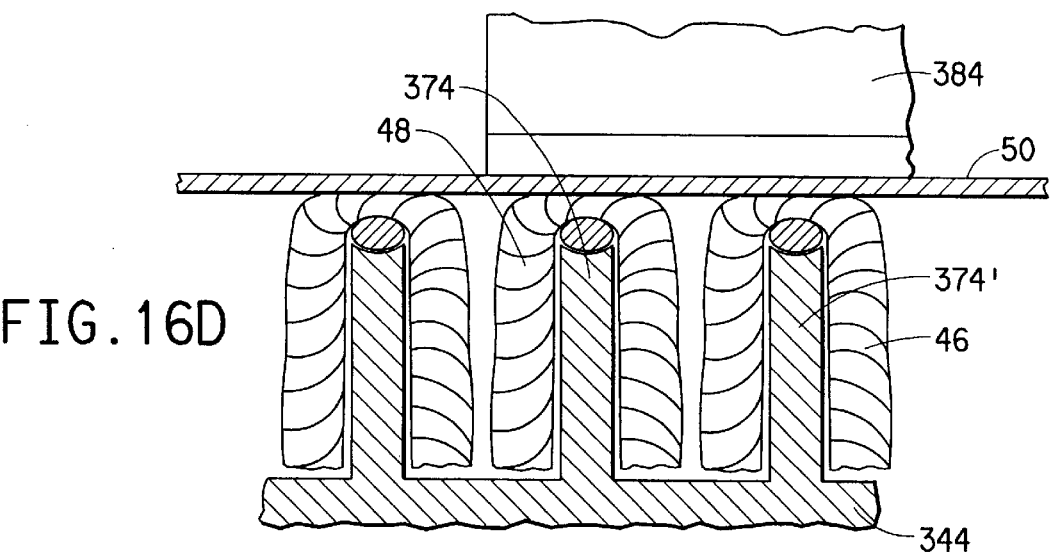

FIG. 16D shows a section through the bonding roll 344 showing how the backing 50 is positioned over the tuftstrings, such as tuftstring 48 and 46, and the ultrasonic horn 384 squeezes them together against ribs 374 and 374' to effect bonding. Horn 384 may bond a plurality of tuftstrings at once using only one ultrasonic driver and booster; for instance, it is believed that eight tuftstrings may be reliably bonded at one time to backing 50 by a single horn/driver/booster.

FIG. 17A shows a typical horn 384 for back-side bonding a plurality of tuftstrings on the warp module 342. The edges 402 and 404 of horn 384 may extend beyond the body of the horn to form the bonding surface 406. The length 408 of the bonding surface 406 (FIG. 17B) is a function of the ultrasonic amplitude, frequency, and power of the driver, and the surface is preferably contoured at a radius 410 as seen in the enlarged view of FIG. 17C. The radius 410 helps guide the backing and tuftstrings under the horn while it is squeezing and bonding them. In FIG. 15 there are a plurality of bonding modules shown to accomplish closely spaced reliable bonding. A plurality of bonding modules aligned with module 346 lightly tack a first plurality of spaced groups of tuftstrings to the backing without disturbing the alignment achieved by the guide module 356 on the ribs of the bonding roll 344. A plurality of bonding modules aligned with module 350 firmly bonds the first plurality of tuftstrings to the backing. A plurality of bonding modules aligned with module 348 lightly tack a second plurality of spaced groups of tuftstrings (making up the remainder of all the tuftstrings) to the backing without disturbing the alignment achieved by the guide module 356 on the ribs of the bonding roll 344. A plurality of bonding modules aligned with module 352 firmly bonds the second plurality of tuftstrings to the backing.

After bonding, the backing with attached tuftstrings, now a carpet structure 412, passes around roll 414 and around drive roll 360. Idler roll 416 is pivotally urged by nip assembly 362 toward drive roll 360 for positive driving of carpet structure 412 through the warp module 342. The carpet structure then passes beyond frame 364 for further processing.

FIG. 18 shows a layout view of a complete carpet-making system including a plurality of tuftstring forming modules 38 and a warp module 342. In the layout shown, five tuftstring forming modules 38a, 38b, 38c, 38d, and 38e are arranged to each provide 144 tuftstrings, for a total of 720 tuftstrings, for a twelve-foot wide carpet product. The tuftstrings are fed in a parallel array 418 to a warp module 342a designed to accept the 720 tuftstrings across the width of the module. A roll of backing substrate is provided at 420. The twelve-foot wide backing substrate 50 passes over a 90-degree turning roll 422 and is fed into the warp module 342a for bonding to the tuftstring array. Each tuftstring forming module is supplied by a creel of yarn, such as creel 424 for module 38a, that may hold up to three ends of yarn for every wrapper in a forming module, or 108 running packages and 108 tie-in packages; and a creel of support strand, such as creel 42G for module 38a, having 144 running packages and 144 tie-in packages. Conventional web accumulators are provided at 428 and 430 to provide continuity of operations. The carpet structure 412a is wound into a roll at windup 432; carpet rolls are accumulated for staging to the finishing line at holding area 434. Machine controller 405 controls the overall process. Operator panel 407 allows for operator input. Distributed controllers 409, 411, 413, 415, 417, and 419 control the ultrasonic systems on the tuftstring forming modules and the warp module.

The tuftstring process is particularly amenable to using pre-dyed yarn (solution-dyed yarn) since the creel of yarn required can be significantly smaller than with conventional carpet tufting operations. A small creel is an advantage when the creel must be changed for every color change for the carpet. When pre-dyed yarn is used in a tuftstring carpet, the carpet structure must go through a separate bulking process since other steps that provide bulking in conventional carpet systems, such as the carpet dyeing operation and latex drying operation, are not necessary. FIG. 19 shows a special finishing line comprising an unwinder 435, a bulking heating oven 436, a cooling chamber 438, a conventional shearing device 440, an inspection conveyor 442, and a windup 444. After winding, the rolls of finished carpet are strapped by strapper 443 and held for shipping at table 445. Conventional web accumulators are provided at 446, 448, and 450 to provide continuity of operations. The bulking process and apparatus are described in copending Provisional application 60/002,091, filed Aug. 10, 1995 (RD-7035) incorporated herein by reference.

The tuftstring forming module 38 in FIG. 2 and modules 38a–e in FIG. 18 require some special control considerations that can best be discussed referring to FIG. 2. In order to start and stop the ultrasonic bonding process and produce acceptable product, the ultrasonic horn amplitude and horn pressure must be ramped up and down as the speed of the tuftstring ramps up and down. During steady state running, the tension on the yarn, support strand, and tuftstring must be monitored and controlled, and the ultrasonic power monitored and controlled to be constant. For example, distributed ultrasonic controller 409 (shown with tuftstring forming module 38 in FIG. 2) is connected to ultrasonic drivers 136 and 136' connected to horns 134 and 134'. Machine controller 405 is connected to distributed controller 409 and to other elements, to be discussed below, that are shown with coiled lines segments.

In addition to the elements already discussed referring to FIG. 2, the tuftstring forming module also includes four motors in the cutter arrangement 86;
voltage-to-pressure regulators 452 and 454, cylinders 142 and 142', and ultrasonic drivers 136 and 136' for bonding modules 78 and 80, respectively; valves 456, 458, and 460 for cylinders 94, 102, and 119, respectively; and tensiometer 462 for monitoring the tension on one of the completed tuftstrings, and tensiometer 464 for monitoring the tension on the corresponding strand, say strand 30.

Motor 113 is responsible for pulling the strand through the mandrel 74, along the mandrel ridges, and pulling the tuftstring after the yarn is bonded on the strand and cut. When starting the tuftstring forming module, the speed of servo motor 113 is monitored by an attached resolver, and the force exerted by cylinders 142 and 142' is ramped up and the horn amplitude exerted by ultrasonic drivers 136 and 136' is ramped up. Both the force and amplitude are ramped in a linear proportion to the ramping rate of the speed of motor 113. There may be some slight delay to account for response delays in the horn and cylinder with the intent that the horn always bonds all yarn to the strand without overbonding and severing any yarn filaments. The force is controlled by machine controller 405 controlling the individual signal to each voltage-to-pressure regulator, such as 452 and 454, on each bonding module. The amplitude is controlled by machine controller 405 controlling the signal to each ultrasonic driver, such as 136 and 136', on each bonding module. When the motor 113 is up to a steady state speed, the machine controller changes from amplitude control to power, or energy, control to maintain stable bonding conditions. The force is held constant, and the amplitude is varied to maintain constant power to each ultrasonic driver and horn. It has been discovered that the ultrasonic driver efficiency changes as the unit heats up during continuous operation. Changing the amplitude to maintain constant power corrects for this changing efficiency so stable bonds are produced. The horn itself has also been observed to heat up. Cooling air can be directed through conduits 455 and 457 to limit the temperature rise experienced by the horn bonding surface; cooling air may also be directed at the drivers.

When stopping the tuftstring, the machine controller changes from constant power control and the reverse procedure for starting is implemented to ramp down the amplitude and force as motor speed 113 ramps down. The baseline for the amplitude is that amplitude sampled just before stopping is executed, since the amplitude is changing as the constant power control is operated. Typical times to ramp the tuftstring speed from about 0–15 YPM is about 3–5 seconds. It has been found in some cases, only the force needs to be ramped at start and stop and the amplitude held constant, but the preferred operation is to ramp both force and amplitude.

During operation of the tuftstring forming module directly coupled to either the drum module 49, or the belt module 311, or the warp module 342, the drive for each of these modules also pulls the tuftstring so the tension of the tuftstring must be monitored by a single tensiometer 462 for each tuftstring forming module, such as 38. The speed of motor 113 is then adjusted by machine controller 405 to keep the tuftstring tension constant. This prevents overtension and slack that may upset the process and break the tuftstring. Likewise, the strand tension must also be monitored by a single tensiometer 464 for each tuftstring forming module 38, and the speed of motor 93 is adjusted by machine controller 405 to keep the strand tension constant. The tensiometers 462 and 464 are set up to measure the same strand line before and after the yarn is bonded to make a tuftstring.

The yarn feed roll motor 101 and wrapper motor 126 are controlled by machine controller 405 so the tension is maintained constant in yarn 40 being fed in and wrapped on mandrel 74. The controller sets the wrap speed to achieve the number of strands per inch desired along the strand per operator instructions from the operator panel 407 (FIG. 18). The speed of motor 101 is set proportional to the speed of wrapper motor 126 to achieve the desired tension based on trial and error. A tensiometer could be used on the yarn line between feed roll 92 and spindle entrance end 120, if desired, to aid in setting up the tension and controlling it, but a fixed speed ratio has been found to work well.

Figure 20A:
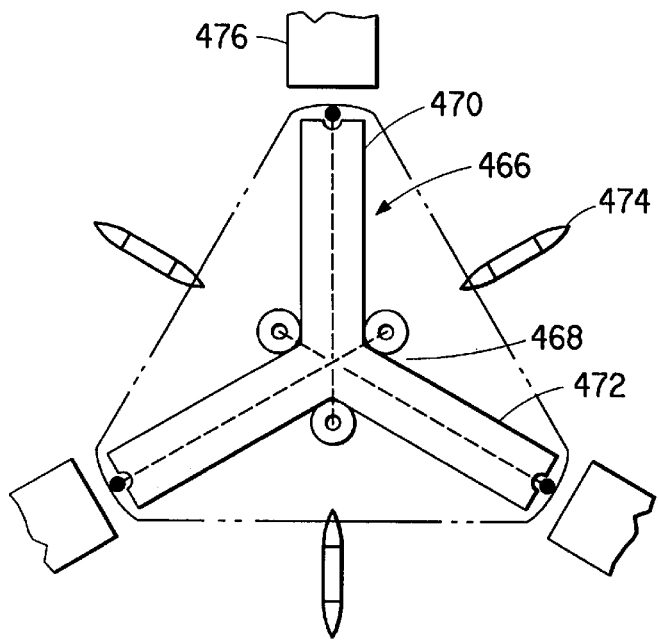
FIGS. 20A, 20B, 20C, 20D, 20E, and 20F are schematic views of different versions of tuftstring forming mandrels.
Figure 20B:
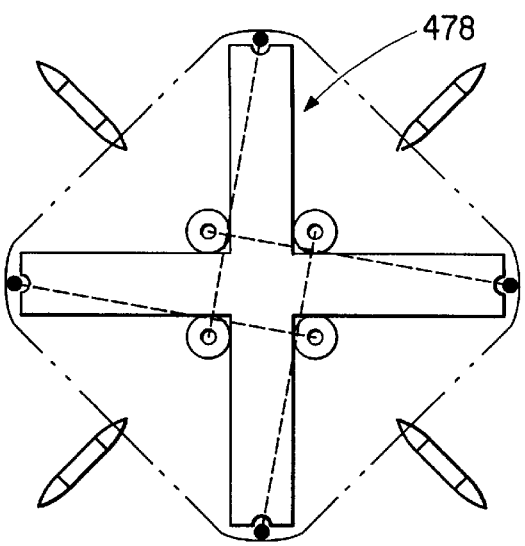
Figure 20C:
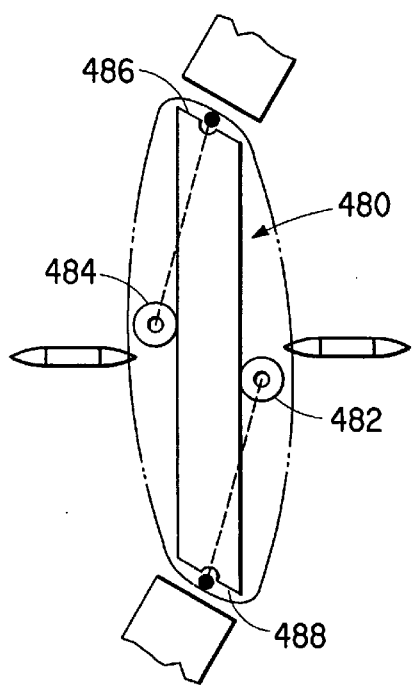
Figure 20D:
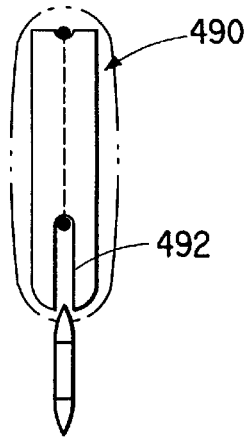
Figure 20E:
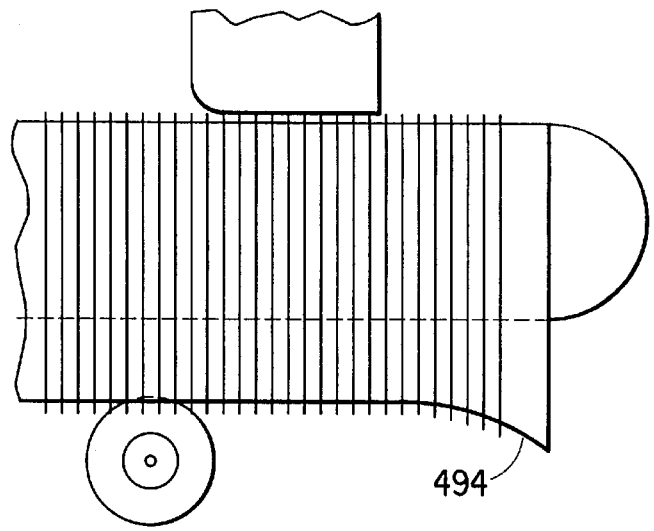
Figure 20F:
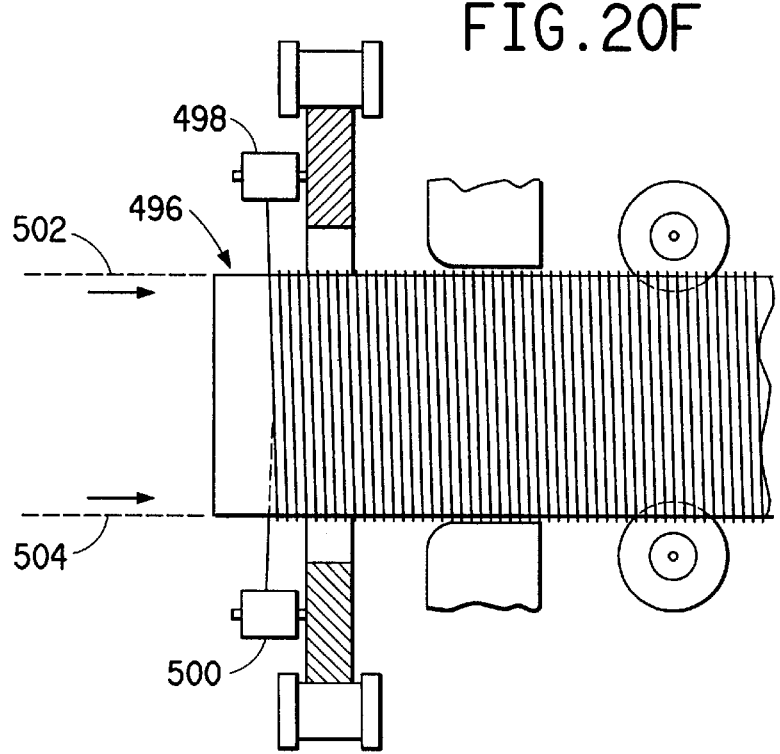

Mandrel 74 has been shown as a hollow structure with the support strand (and/or carrier strands) going through the center inside the wrap of the face yarn. Other "hollow" mandrel structures may work as well. FIG. 20A shows a star-shaped mandrel 466 with three arms where the support strands (or carrier strands if all the support strands are bonded to the outside of the yarn wrapped on the mandrel) pass through the valleys, such as 468, between the arms, such as 470 and 472 of the mandrel. The strand paths from the center to the ridges cross one another. Cutters, such as 474 and ultrasonic horns, such as 476 are arranged around the mandrel. FIG. 20B shows a star-shaped, four-arm mandrel 478 where the strand paths from the center to the ridges are not perfectly aligned with the center of the arms. Another variation of the mandrel is shown in FIG. 20C where mandrel 480 makes only two tuftstrings and there are guide tubes 482 and 484 for the strands. The surface of the ridges 486 and 488 can be arranged perpendicular to the strand path to minimize strand twisting if the strand has a flat or oblong side. FIG. 20D shows a one tuftstring mandrel 490 with a slot 492 along one edge to guide the support strand and provide a groove for cutting. FIG. 20E shows a side view of the mandrel of FIG. 20D to show a sloped end 494 on one mandrel edge to assist in transporting the yarn to the ultrasonic horn since there is no support strand engaging the yarn on this edge to aid in transporting the yarn. In the alternate mandrel embodiments just discussed, the cutter blade is shown without requiring a bed-knife to achieve cutting of the yarn. FIG. 20F shows a side view of a solid mandrel 496. The yarn is fed from discrete sources 498 and 500 that rotate about mandrel 496. In this way, the strands 502 and 504 can be fed in as shown instead of along the mandrel, so the mandrel does not need to be hollow or star-shaped with passages for support strands or carrier strands.

Although the invention has been described in terms of making a cut pile carpet, the tuftstring forming module 38 can be fitted with mandrels modules suitable for making loop pile tuftstrings. Such mandrels modules would be based on the loop pile tuftstring apparatus and process described in copending application Ser. No. 08/331,074 filed Oct. 28, 1994 now, U.S. Pat. No. 5,470,629 (RD-6345-B), incorporated herein by reference. In this case, more mandrels would be required since one mandrel makes only one loop pile tuftstring, although each loop pile tuftstring has two rows of loops so fewer tuftstrings would be required in the carpet to get the same coverage as a cut pile tuftstring. The loop pile tuftstring would be forwarded to one of the carpet forming modules 49, 311, or 342 as desired to form a loop pile tuftstring carpet. Guiding and bonding techniques similar to those described for cut pile tuftstring would be used. A different finishing line would be used for the loop pile carpet depending on the use intended for the carpet.

What is claimed is:

1. A method of bonding two support strands to yarn wrapped thereon, comprising:

placing a first strand in a first groove and a second strand in a second groove, said grooves being spaced apart on adjacent ridges on a mandrel which acts as an ultrasonic anvil;

wrapping yarn over said first strand so that yarn on the two sides of the first strand defines a first included angle;

wrapping yarn over said second strand so that yarn on the two sides of the second strand defines a second included angle; and pressing the wrapped yarn against the two strands with an ultrasonic horn energized by a single ultrasonic driver wherein said horn has a first surface contacting said yarn so that said first surface is essentially perpendicular to a first imaginary plane passing through said first strand and essentially bisecting said first included angle for forming a first bond at said first strand, and said horn has a second surface angled to said first surface for contacting said yarn so that said second surface is essentially perpendicular to a second imaginary plane passing through said second strand and essentially bisecting said second included angle for simultaneously forming a second bond at said second strand.

2. The method of claim 1, including the step of varying the circumference of the mandrel to thereby vary the circumference for the wrapped yarn from a first position where said yarn is first wrapped over said strands to a second position adjacent said horn so that the distance along the yarn from the first strand to the second strand is greater at said first position than at said second position to accommodate shrinkage in the yarn during bonding.

* * * * *